(12) United States Patent
Novak et al.

(10) Patent No.: US 10,955,011 B2
(45) Date of Patent: Mar. 23, 2021

(54) HYDRAULIC SYSTEM OF A TRANSMISSION WITH A MULTIPLE NUMBER OF PRESSURE CONTROL VALVES

(71) Applicant: ZF Friedrichshafen AG, Friedrichshafen (DE)

(72) Inventors: Rainer Novak, Bregenz (AT); Tobias Pfleger, Markdorf (DE); Alexander Hoffmann, Lebach (DE); Markus Terwart, Thundorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 826 days.

(21) Appl. No.: 15/306,603

(22) PCT Filed: Mar. 25, 2015

(86) PCT No.: PCT/EP2015/056334
§ 371 (c)(1),
(2) Date: Oct. 25, 2016

(87) PCT Pub. No.: WO2015/161973
PCT Pub. Date: Oct. 29, 2015

(65) Prior Publication Data
US 2017/0045098 A1 Feb. 16, 2017

(30) Foreign Application Priority Data
Apr. 25, 2014 (DE) .................. 10 2014 207 808.3

(51) Int. Cl.
*F16H 61/68* (2006.01)
*F16D 48/02* (2006.01)
(Continued)

(52) U.S. Cl.
CPC .......... *F16D 25/14* (2013.01); *F16H 61/0021* (2013.01); *F16H 61/0206* (2013.01);
(Continued)

(58) Field of Classification Search
None
See application file for complete search history.

(56) References Cited

U.S. PATENT DOCUMENTS 5,240,093 A * 8/1993 Wagner ............... F16H 61/0206
192/3.58
2010/0120583 A1 5/2010 Fritzer
(Continued)

FOREIGN PATENT DOCUMENTS

DE 19943939 A1 3/2001
DE 102006049972 A1 5/2008
(Continued)

OTHER PUBLICATIONS

International Search Report (English Translation) PCT/EP2015/056334, dated Jun. 18, 2015. (3 pages).

*Primary Examiner* — Charles A Fox
*Assistant Examiner* — Ryan P Dodd
(74) *Attorney, Agent, or Firm* — Dority & Manning, P.A.

(57) ABSTRACT

A hydraulic system of a transmission includes a plurality of pressure control valves. A pilot force component and an actuating force component of additional pressure control valves are applicable in the direction of a first end position of a valve slide. A downstream pressure of the additional pressure control valves is applicable in the direction of a second end position of the valve slide. Clutch valves are configured to be brought into operative connection by a pilot-controlled valve unit with an area guiding pressure of a primary pressure circuit or with an additional valve unit. The additional valve unit is a pressure-limiting valve with a predefined pressure level adjusted upstream of the additional valve unit and connected downstream to a low-pressure area.

7 Claims, 17 Drawing Sheets

(51) Int. Cl.
*F16H 61/00* (2006.01)
*F16H 61/02* (2006.01)
*F16H 61/688* (2006.01)

(52) U.S. Cl.
CPC ...... *F16D 48/0206* (2013.01); *F16H 61/0031* (2013.01); *F16H 61/688* (2013.01)

(56) References Cited

U.S. PATENT DOCUMENTS

2012/0011842 A1  1/2012  Gierer et al.
2012/0329606 A1  12/2012  Herrmann et al.

FOREIGN PATENT DOCUMENTS

| DE | 102009002105 A1 | 10/2010 |
| DE | 102010001069 A1 | 7/2011 |
| DE | 102011078113 A1 | 12/2012 |

* cited by examiner

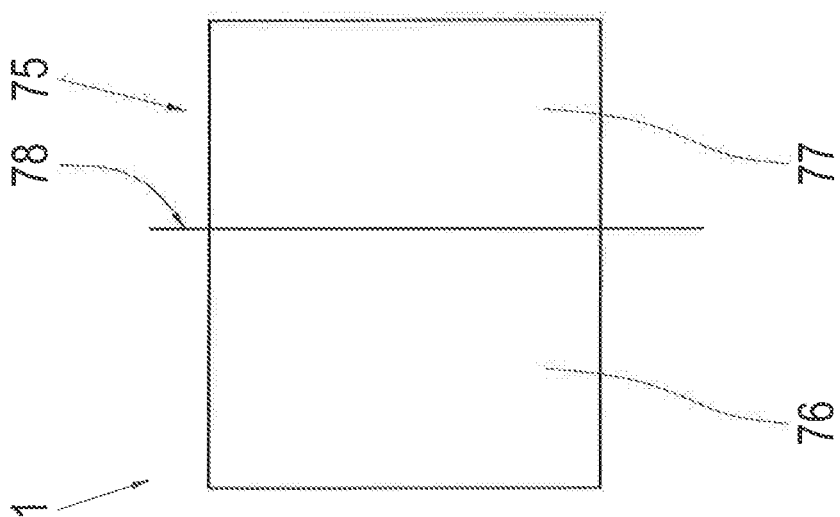

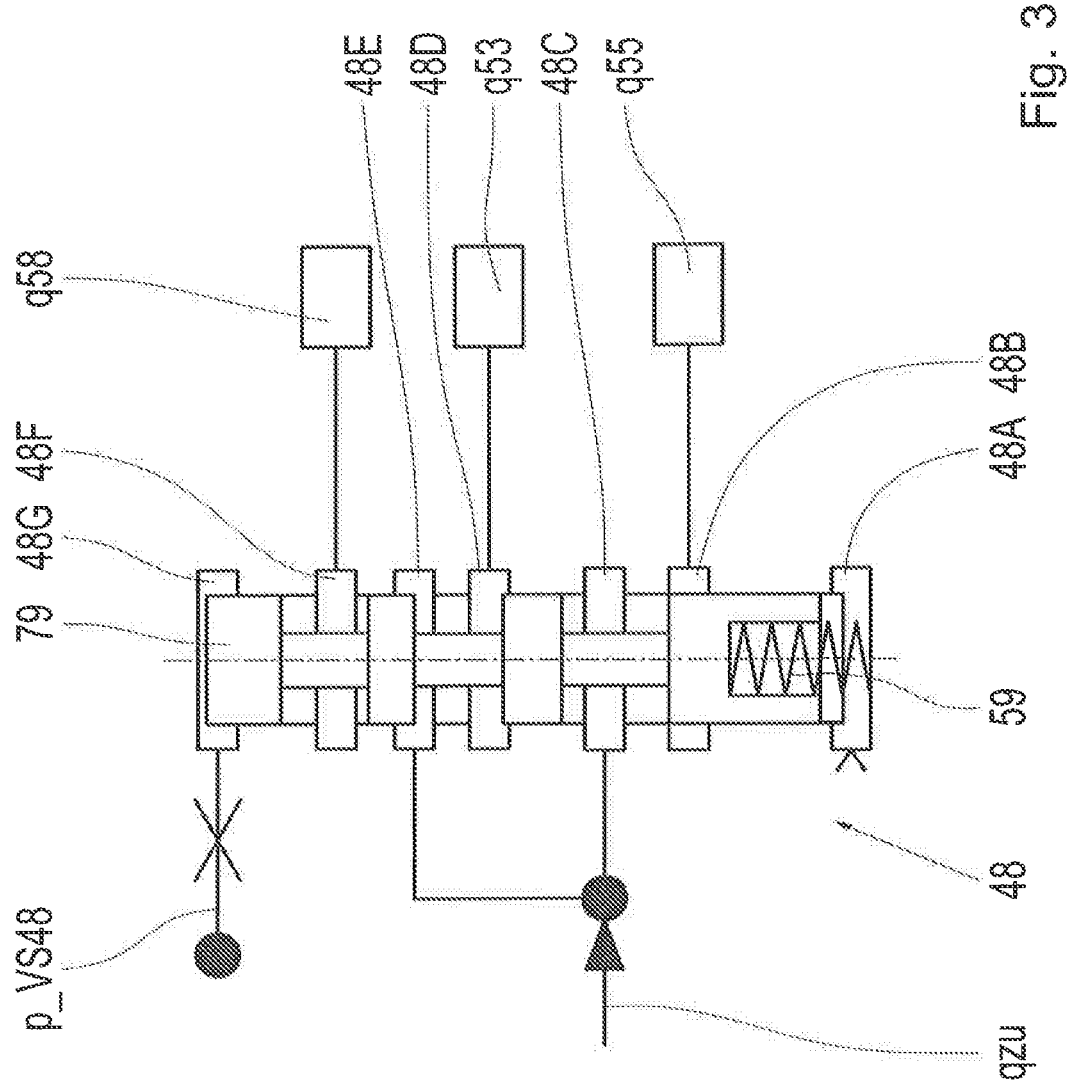

HYDRAULIC SYSTEM OF A TRANSMISSION WITH A MULTIPLE NUMBER OF PRESSURE CONTROL VALVES

FIELD OF THE INVENTION

The invention relates generally to a hydraulic system of a transmission with a multiple number of pressure control valves.

BACKGROUND

In order to prevent the emptying of hydraulic lines of hydraulic systems of transmissions known from practice, pressure control valves of hydraulic systems, such as clutch valves or an additional clutch valve allocated to a hang-on clutch, are in operative connection with so-called "pre-filling valves." Typically, a multiple number of pressure control valves of hydraulic systems or hydraulic actuating devices of transmissions share a common pre-filling valve. In the area of the pre-filling valves, a certain minimum pressure in hydraulic lines is set, whereas typical values between 0.2 to 0.4 bar are present. In terms of structure, they are usually designed as spring-loaded seat valves, such as plate valves. Pre-filling valves themselves can regulate the constant pre-filling pressure only if a defined minimum flow rate at the associated hydraulic control volume is present. If the minimum flow is reached, for example, by associated valve leakages, the associated pressure level is not defined shortly after a start of the drive unit.

For reasons of installation space and costs, it is also typically the case that there are efforts to minimize the number of pre-filling valves. However, this disadvantageously leads to the fact that the associated network topology is significantly more complex, since at least two, often up to five, pressure control valves are to be connected to a common channel, which in turn is connected to a low-pressure area or an oil sump by a corresponding pre-filling valve. Thus, a reduction in the number of components is achieved with more complex line guidance. If an associated pilot stage or a respective associated pilot pressure control valve is not supplied with power, the pre-filling pressure level is always applied by the associated actuator.

Hydraulic systems that are known to date, which are designed with as few pre-filling valves as possible for a multiple number of pressure control valves, have the following disadvantage, among others:

Since the actuators, the clutches, the shift cylinders and the like are emptied by the pre-filling lines, the associated line cross-sections have relatively large dimensions by comparison. In addition, the pre-filling lines cross the entire housing of the actuating device, depending on the number of valves connected. The installation space required for this is disadvantageously no longer available for the unbundling of the remaining network topology.

Furthermore, it is disadvantageous that the line resistances that are effective despite the large channel cross-sections at low operating temperatures cause significantly extended discharge times in the area of the clutches. Depending on how far the tank connection of a 3/2-pressure control valve is distant from the associated pre-filling valve, such emptying periods can also be significantly scattered. For this reason, the temperature range for emptying processes may impair the spontaneity of individual gearshifts to a non-negligible extent. Moreover, it is also disadvantageous that an active pre-filling required for reasons of accuracy causes leakage losses, which reduce overall efficiency.

When a clutch is opened, that is, upon the rapid emptying of at least one of the connected pressure control valves by a pre-filling valve, a short-term pressure increase occurs in the area of the pre-filling line. All other, preferably open clutches or gear actuators are then subjected to a higher pressure level by their common pre-filling pressure level. During such operating situations, a calibration of a pressure sensor system cannot be carried out (for example). If, in the area of the pre-filling lines, an active pre-filling as a function of the currently prevailing operating temperature of the hydraulic fluid volume is not provided, there is the possibility, disadvantageously, that the time span that elapses until the correct rebuilding of the pre-filling pressure may be significantly greater than 10 seconds. Thus, hardly any calibrating operations can be carried out, particularly at low operating temperatures of a transmission.

The pressure control valves are usually designed as so-called "spring-loaded slide valves." This means that the valve slides of the pressure control valves are guided against a mechanical end stop, without a corresponding control, through the associated pilot stage, by the respectively applied spring force. Thereby, the valve slides of the pressure control valves travel over comparatively large actuating paths, in order to ensure sufficient opening cross-sections between a tank connection of the pressure control valves and the associated pre-filling line. As soon as the associated pilot stages, in each case, apply a pilot pressure in the area of the pressure control valves, the valve slides must be displaced against the spring force from the current end position. In steering and control behavior, the large actuating paths cause significant dead times between the control signal and the point in time at which the required working pressure or clutch pressure is adjusted. Thereby, the spontaneity of the pressure build-up decreases, the greater the actuating path to be traveled through by the valve slide.

SUMMARY OF THE INVENTION

As such, exemplary aspects of the present invention assist with providing a hydraulic system of a transmission with a multiple number of pressure control valves, with which the described disadvantages are avoided.

The hydraulic system of a transmission in accordance with exemplary aspects of the invention includes a multiple number of pressure control valves, in the area of which an applied pressure can be adjusted to a pressure level to be adjusted downstream as a function of a total force component acting on a valve slide depending on the operating state. The total force component is adjusted as a function of a pilot force component that can be applied to the valve slide, an actuating force component and a control or regulating force component that exists as a function of the pressure level prevailing downstream.

In accordance with exemplary aspects of the invention, the pilot force component and the actuating force component can each be applied with equal effect in the direction of a first end position of a valve slide of a pressure control valve on the valve slide, in which the area upstream of the pressure control valve is connected to the area downstream of the pressure control valve by the pressure control valve, while the pressure downstream of the pressure control valve of the pilot force component and the actuating force component can be applied with counteracting effect and in the direction of a second end position of the valve slide on the valve slide, in which the area downstream of the pressure control valve is connected to a low-pressure area.

With the hydraulic system in accordance with exemplary aspects of the invention, each of the pressure control valves is connected directly to the low-pressure area or an oil sump, whereas this connection is designed, in terms of structure, directly in the associated cast pocket. In order to prevent the emptying in this area of the hydraulic system or in the area of the pressure control valves and the hydraulic lines present downstream of the pressure control valves, the actuation force component can be applied to the valve slide of a pressure control valve, which component acts on the valve slide with equal effect as the respective pilot force component that can be applied. Thus, in the case of a non-applying pilot force component without an allocated pre-filling valve in the area of the pressure control valves, a separate pre-filling pressure can be adjusted by the actuating force component.

Furthermore, only small actuating paths must be overcome by the pilot force and actuating force components acting with equal effect on the valve slide of one of the pressure control valves upon an application of the pilot force component as an addition to the actuating force component of the valve slide, by which the spontaneity of a pressure build-up with the hydraulic system in accordance with exemplary aspects of the invention is substantially higher than with known hydraulic systems.

In addition, lines or their line cross-sections provided for ventilating actuators, clutches, shift cylinders and the like have accordingly large dimensions only between the pressure control valves and such assemblies, by which a need for installation space of the hydraulic system in accordance with exemplary aspects of the invention is reduced in comparison to known systems. With the hydraulic system in accordance with exemplary aspects of the invention, discharge times in the area of clutches are shorter than with conventional hydraulic systems, since the length of lines running between the clutches and the low-pressure area with the hydraulic system in accordance with exemplary aspects of the invention can be designed to be shorter than in known hydraulic systems.

With the hydraulic system in accordance with exemplary aspects of the invention, based on the fact that a coupling is not present, undesired short-term pressure increases, which occur, for example, upon the opening of a coupling in the area of a pre-filling line, do not apply in the area of additional transmission components to be actuated with hydraulic pressure, by which, for example, a pressure sensor can be calibrated to the desired extent.

If at least one part of the pressure control valves is coupled directly with an area of the hydraulic system in accordance with exemplary aspects of the invention that guides pressure of a primary pressure circuit, a pressure level to be adjusted downstream of the pressure control valves can be adjusted in a structurally simple manner.

In an advantageous embodiment of the hydraulic system in accordance with exemplary aspects of the invention, one part of the pressure control valves can be brought into operative connection by a pilot-controlled valve unit with an area guiding pressure of a primary pressure circuit or with an additional valve unit, whereas the additional valve unit is designed as a pressure-limiting valve, and a predefined pressure level is adjusted upstream of the additional valve unit and is connected downstream to a low-pressure area.

With this embodiment of the hydraulic system in accordance with exemplary aspects of the invention, the disadvantages known from practice do not arise. In addition, the emptying of a line area of the hydraulic system in accordance with exemplary aspects of the invention between the pilot-controlled valve unit and the pressure-regulating valves interacting with it is also avoided with little effort in terms of structure.

If the pilot force component can be adjusted as a function of a pilot pressure that can be adjusted in the area of a pilot pressure control valve, which can be applied in the area of a control surface of the valve slide of one of the pressure control valves, the pressure level to be adjusted downstream of the pressure control valve can be adjusted with little need for installation space.

If the actuating force component corresponds to a spring force of a spring device acting on the valve slide of one of the pressure control valves, the hydraulic system in accordance with exemplary aspects of the invention can be operated with little steering and control effort.

With a structurally simple and cost-effective design of the hydraulic system in accordance with the invention, the pressure control valves are designed as 3/2-way valves.

Both the characteristics specified in the claims and the characteristics specified in the subsequent embodiments of the hydraulic system or the hydraulic actuating device under the invention are, by themselves alone or in any combination with one another, suitable for providing additional forms for the object under the invention. In terms of the additional forms of the object under the invention, the particular combinations of characteristics do not represent a limitation; rather, they are essentially solely of an exemplary nature.

BRIEF DESCRIPTION OF THE DRAWINGS

Additional advantages and advantageous embodiments of the hydraulic system, in accordance with the invention arise from the claims and the embodiments described below, with reference to the drawing in terms of principle, whereas, in the description of the various embodiments, for the benefit of clarity, the same reference signs are used for structurally and functionally identical components.

The following is shown:

FIG. 2a a schematic view of a housing with an interface device of the actuating device according to FIG. 1;

FIG. 3 a single view of a valve device of the hydraulic actuating device according to FIG. 1 in a first operating state;

DETAILED DESCRIPTION

Figure 1:
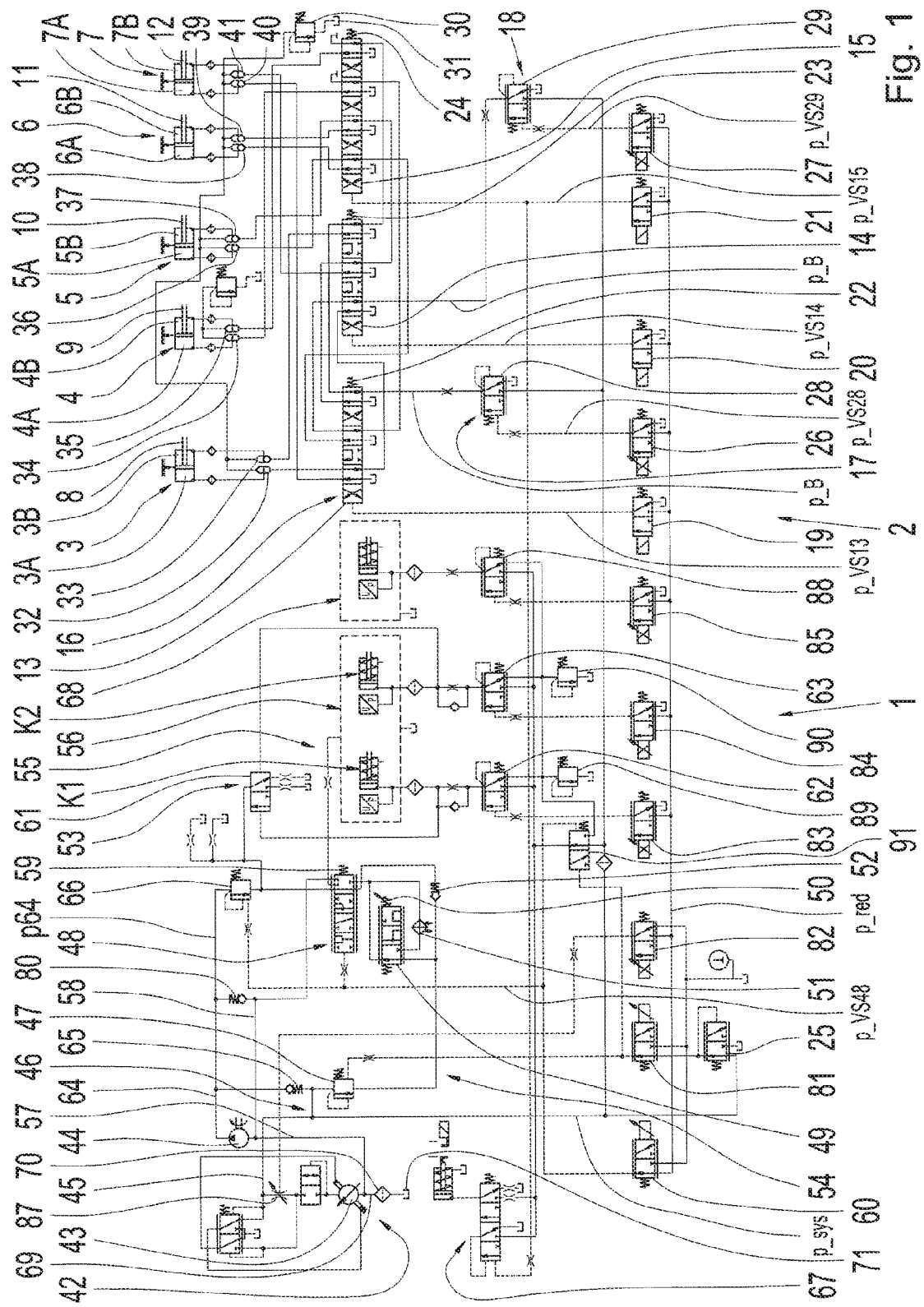
FIG. 1 a hydraulic diagram of a first embodiment of the hydraulic system in accordance with exemplary aspects of the invention or of the hydraulic actuating device in accordance with exemplary aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a hydraulic diagram of a hydraulic system 1 or a hydraulic actuating device of a transmission 2, which is designed as a dual-clutch transmission, in which nine transmission ratios for forward travel and one transmission ratio for reverse travel can be engaged. The transmission ratios can be engaged and disengaged by the hydraulically actuated piston/cylinder devices 3 through 7 and adjustable shifting elements 8 through 12, which in the present case are designed as shifting rods. Through a valve device 16, in the present case including three shift valves 13 through 15 that are pilot-controlled and coupled with one another through lines can be applied in the area of the piston/cylinder devices 3 through 7 or in the area of the piston chambers 3A, 3B or 4A, 4B or 5A, 5B or 6A, 6B or 7A, 7B, as the case may be. Each of the shift valves 13 through 15 features a multiple number of shifting positions for the presentation of the transmission ratios. The actuating pressure p_B is freely adjustable in the area of two pressure control valve units 17, 18, and can be forwarded in the direction of the shift valves 13 through 15.

By a pilot pressure valve unit 19, 20 and 21, which is designed as a magnetic valve, each of the shift valves 13 through 15 can be subjected to pilot pressure p_VS13, p_VS14 or p_VS15, as the case may be, in the direction of a shifting position, in each case against a spring device 22, 23 or 24, as the case may be, which acts on one of the shift valves 13 through 15 in the direction of a first shifting position. The pilot pressures p_VS13, p_VS14 and p_VS15 of the shift valves 13 through 15, as a function of the present shifting position of the pilot pressure valve unit 19, 20 or 21, are either equal to zero or correspond to a pressure value of a pressure signal p_red, which is adjustable in the area of a pressure-reducing valve 25 as a function of a system pressure p_sys.

Each of the pressure control valve units 17 and 18 includes a pilot pressure control valve 26, 27 and a respective pressure control valve 28, 29. In the area of each of the pressure control valves 28 and 29, each of the supply pressure and/or the system pressure p_sys can be adjusted to a respectively requested pressure level of the actuating pressure p_B by a pilot pressure p_VS28 or p_VS29, as the case may be, that can be predefined in the area of the pilot pressure control valves 26 and 27 and can be applied in the area of the pressure control valves 28 and 29.

In the currentless operating state of the pilot pressure valve units 19 through 21, each of the shift valves 13 through 15 is shifted by the respectively allocated spring devices 22, 23, 24 into its first shifting position shown in FIG. 1. In this operating state of the valve device 16, the pressure control valves 28 and 29 of the pressure control valve units 17 and 18 are separated from the piston/cylinder devices 3 through 7. Nevertheless, if an actuating pressure p_B is adjusted in the area of the pressure control valves 28 and 29, the actuating pressure p_B is not forwarded by the shift valves 13 through 15 in the direction of the piston/cylinder devices 3 through 7. In the area between the shift valves 13 through 15 and the piston/cylinder devices 3 through 7, a pressure-limiting valve 30 can be brought into operative connection with the piston chambers 3A through 7B by so-called "ball-change valves" 32 through 41. Thus, in the area of the piston chambers 3A through 7B, a pressure level can be adjusted by the pressure-limiting valve 30, through which the emptying of the piston chambers 3A through 7B is avoided in a simple manner. Above the response pressure level of the pressure-limiting valve 30, pressure-limiting valve 30 opens and hydraulic fluid is guided in the direction of a low-pressure area 31 by the pressure-limiting valve 30.

Depending on the particular application, it is also possible to design the valve device 16 without the two pressure control valves 28 and 29, whereas the supply pressure p_sys is then to be applied in the area of the pilot pressure control valves 26 and 27, which are designed as directly controlled pressure control valves, and the respectively requested pressure level of the actuating pressure p_B is directly adjusted and forwarded in the direction of the shift valves 13 through 15.

The actuating device 1 is additionally coupled with a pump device 42 with two pump units 43, 44, whereas the first pump unit 42 is formed as an adjustable vane cell pump and the second pump unit 44 is formed as a constant pump.

In the present case, the first pump unit 43 constitutes the main transmission pump, which is coupled in a manner known per se with a transmission input shaft, which is not shown in detail in the drawing, and thus can be driven by a drive unit, preferably an internal combustion engine, that can be connected to the transmission input shaft of the transmission 2. In contrast to this, the second pump unit 44 is coupled with the transmission output shaft, which in turn is connectable in a manner known per se to an output of a vehicle drive train designed with the transmission 2 and can be driven with a drive rotational speed that is equivalent to the output rotational speed. A pressure side 45 of the first pump unit 43 is connected to a primary pressure circuit 46, in which the system pressure p_sys prevails, which in turn can be adjusted by a pilot-controlled system pressure valve 47. Downstream of the system pressure valve 47, a valve device 48 that is likewise pilot-controlled is provided, which constitutes a so-called "cooling valve" formed as a control valve.

In addition, a so-called "thermal bypass valve" 49, which is designed with a thermocouple 50, is allocated to the cooling valve 48, in order to adjust, to the desired extent, a volume flow of hydraulic fluid guided by a cooling unit 51 as a function of a currently prevailing operating temperature. In the present case, the system pressure valve 47 is connected directly with the cooling valve 48 above a response limit of the bypass valve 52 by a bypass valve 52. Below the response limit of the bypass valve 52, the hydraulic fluid volume guided downstream of the system pressure valve 47 in the direction of the cooling valve 48 is, as a function of the present operating state of the thermal bypass valve 49, either forwarded completely in the direction of the cooling valve 48, guided in part directly in the direction of the cooling valve 48 and in the other part by the cooling unit 51 in the direction of the cooling valve 48 or forwarded completely by the cooling unit 51 and then in the direction of the cooling valve 48.

In the first shifting position of the cooling valve 48 shown in FIG. 1, the primary pressure circuit 46 is connected to a first area 53 of a secondary pressure circuit 54, which is located downstream of the system pressure valve 47. In a second shifting position of the cooling valve 48, the primary pressure circuit 46 is connected by the cooling valve 48 both to the first area 53 of the secondary pressure circuit 54 and to a second area 55 of the secondary pressure circuit 54, by which two clutches K1 and K2 of a dual-clutch system 56 of the transmission 2 can be subjected to a quantity of cooling oil that is required depending on the operating state. A suction side 57 of the second pump unit 44 is separated from the system pressure valve 47 in the area of the cooling valve 48 both in the first shifting position and in the second shifting position of the cooling valve 48.

If the cooling valve 48 is, by a spring force of a spring device 59 acting on the cooling valve 48, transferred into a third shifting position from a pilot pressure p_VS48 that is adjustable in the area of an additional pilot pressure control valve 60, the primary pressure circuit 46 is connected to the second area 55 of the secondary pressure circuit 54 by the cooling valve 48, by which the hydraulic fluid volume introduced into the secondary pressure circuit 54 by the primary pressure circuit 46 by the system pressure valve 47 is completely used for cooling the dual-clutch system 56.

In this case, the first area 53 of the secondary pressure circuit 54 includes a so-called "lubrication spider," by which various components of the transmission 2 are subjected to hydraulic fluid for lubrication and cooling. In addition, a gear set cooling is carried out through the first area 53 of the secondary pressure circuit 54, whereas the volume flow of hydraulic fluid guided in the direction of the gear set cooling is led by a gear set cooling valve 61 into the area of the gear set of the transmission 2, which is allocated to the currently switched-on clutch K1 or K2, and transfers the torque currently to be guided through the transmission 2. For this purpose, an actuating pressure for the clutches K1 and K2 adjusted in the area of clutch valves 62, 63 is applied in the area of control surfaces of the gear set cooling valve 61, and the gear set cooling valve 61 is transferred into the respectively desired shifting position, in order to provide the area of the gear set of the transmission 2 currently switched on in the power flow with cooling and lubricating oil to the required extent. In the present case, a pressure side 64 of the second pump unit 44 is connected to the primary pressure circuit 46 by a non-return valve device 65 upon reaching a response limit of the non-return valve device 65. A pressure p64 of the pressure side 64 of the second pump unit 44 can be varied as a function of a pressure-limiting valve 66 or a retaining valve which can be pilot-controlled by the pilot pressure control valve 60.

By the first pump unit 43, the hydraulic supply of the allocated actuators that is in line with demand takes place. For example, the clutch valves 62 and 63, which are allocated to the two clutches K1 and K2, and a parking brake system 67, are supplied with hydraulic fluid starting from the primary pressure circuit 46 or the first pump unit 43, as the case may be. In principle, the second pump unit 44 is allocated to the first area 53 of the secondary pressure circuit 54, which represents a separate low-pressure circuit, and supplies a lubrication spider of the gear set cooling system and a four-wheel clutch 68, which represents a so-called "hang-on clutch."

During normal operating conditions, during which a drive unit, designed in the present case as an internal combustion engine, of an automotive drive train designed with the transmission 2 is switched on, and the rotational speed of the transmission input shaft is greater than zero and at the same time the travel speed or drive speed is likewise greater than zero, the gear set of the transmission 2 and the four-wheel clutch 68 are supplied with hydraulic fluid at least starting from the second pump unit 44 through the first area 53. Since the load on the gear set of the transmission 2 typically increases as the vehicle speed increases, through the second pump unit 44, the pump drive rotational speed of which or the conveying flow of which is proportional to the vehicle speed, a cooling and lubrication of the gear set that is in line with demand also automatically takes place at specific operating points.

In the case of a stationary vehicle or at slow travel speeds and, at the same time high, torque loads in the area of the gear set, for example during a racing start, during which a rotational speed of the drive unit is nearly at a maximum and the driver applies the service brake at the same time, the gear set of the transmission 2 can be supplied, based on the configuration described above of the actuating device 1, with hydraulic fluid also by the first pump unit 43 or the vane cell pump, as the case may be, through the system pressure valve 47, the bypass valve 52 and the cooling valve 48. In principle, this additional supply option of the first area 53 starting from the first pump unit 43 enables a smaller dimensioning of the second pump unit 44.

If the drive unit of the vehicle drive train is switched off at higher travel speeds during coasting mode, for example, and the first pump unit 43 does not supply any hydraulic fluid, the option exists of supplying the primary pressure circuit 46 with hydraulic fluid by the non-return valve device 65 starting from the second pump unit 44, which is then driven at the output rotational speed or at a rotational speed that is equivalent to it. If the pressure on the pressure side 64 of the second pump unit 44 is raised by the pressure-limiting valve 66, the option exists of, at certain operating points of the transmission 2 or the vehicle drive train designed with it, maintaining a limited functionality of the transmission 2, for example gear tracking, clutch cooling or the like, by the second pump unit 44.

During such operating state sequences of the vehicle drive train, the second pump unit 44 receives its drive energy from the vehicle mass and, based on the direct energy conversion in contrast to an electrically operated auxiliary pump, does not cause any undesired load of an electrical wiring system or the like, and can be operated with a favorable degree of efficiency and is characterized by a low installation space/power requirement ratio. Additional electrical devices can then be supplied with electricity for a period longer than is the case with vehicles that are designed with additional electrically drivable pumps. In particular, during coasting mode with a transmission ratio engaged in the area of the transmission for couplings that are subjected to actuating pressure at the same time, under certain circumstances, it is even possible to charge an electrical accumulator if an electrically operated unit is provided.

As long as the travel speed of a vehicle designed with the transmission 2 is greater than zero, even when the drive unit is switched off, the primary pressure circuit 46 is prevented from emptying, since the primary pressure circuit 46 is permanently supplied with hydraulic fluid by the second pump unit 44 starting from the second pump unit 44 above the positive pressure gradient required for the opening of the non-return valve device 65 between the pressure side 64 of the second pump unit 44 and the primary pressure circuit 46. In turn, it follows that, upon a restart of the drive unit, the desired operating conditions, such as the engagement of a desired gear and the simultaneous pressing of the clutches of the transmission 2, can be produced without major delays.

For example, when gear shifts are performed in the transmission 2, the cooling of the two clutches K1 and K2 are switched off starting from the primary pressure circuit 46 in the area of the cooling valve 48, in order to carry out the respective requested gearshift without any delay within desired short operating times. In such an operating state, the gear set can be supplied with hydraulic fluid by the second pump unit 44.

The two pump units 43 and 44 feature a common suction line 69 with a common filter device 70. At sufficiently high travel speeds, the suction charging of the second pump unit 44 is used for the common suction line 69, by which an energetic relief of both pump units 43 and 44 is possible. By the common suction line 69, the two pump units 43 and 44 suck in hydraulic fluid from a common oil chamber 71, which essentially corresponds to the low-pressure area 31 or is connected to it.

Figure 2:
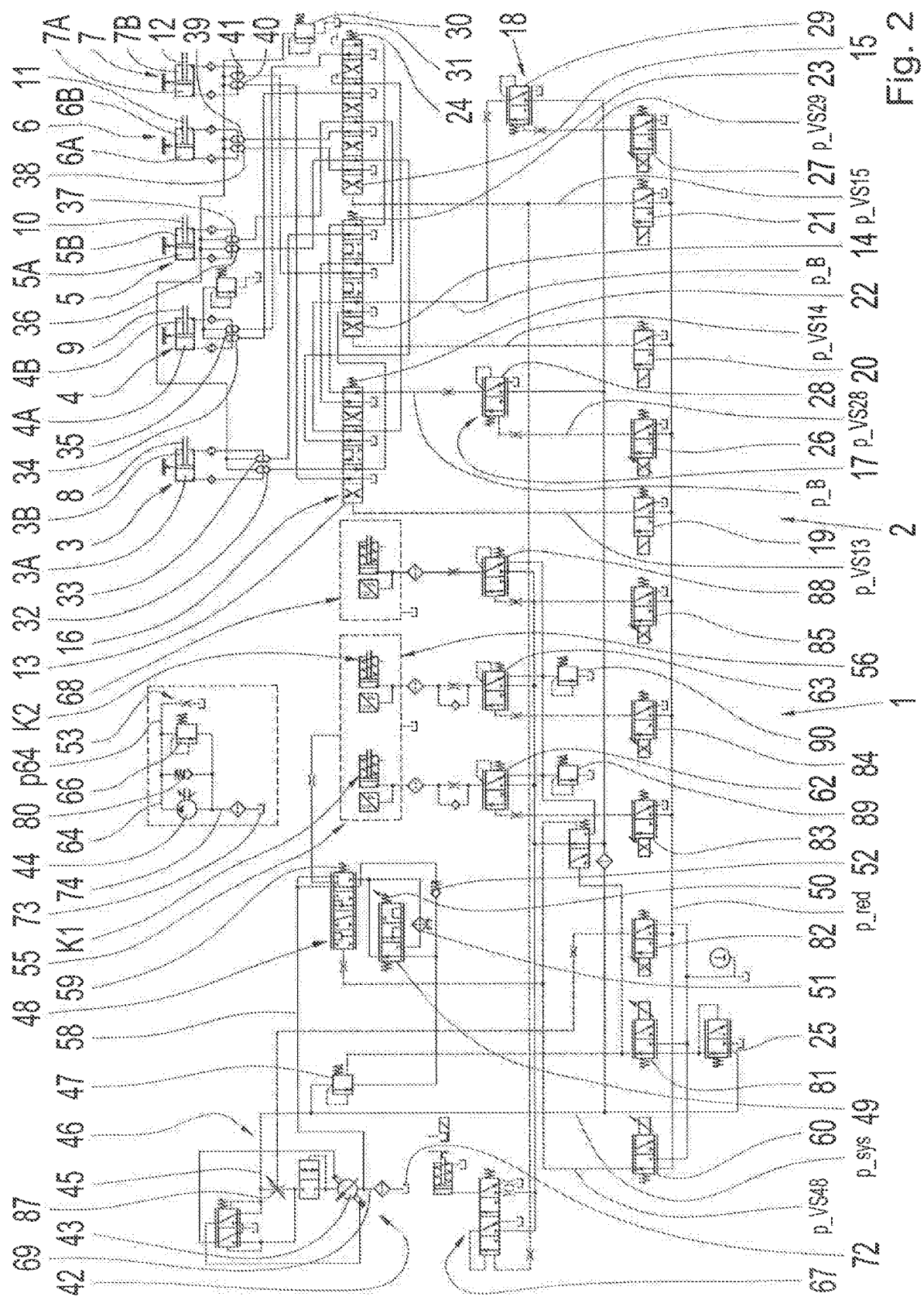
FIG. 2 a hydraulic diagram of a second embodiment of the hydraulic system in accordance with exemplary aspects of the invention or of the hydraulic actuating device in accordance with exemplary aspects of the invention.

The actuating device 1 is designed with a housing 75 in the manner shown in more detail in FIG. 2a, in which the steering and control components described in detail above can be arranged, and such hydraulic lines connected to one another are provided. The housing 75 can be coupled with the pump units 43 and 44 or the hydraulic pumps, as the case may be, and in the present case includes two housing parts 76, 77, which are connected to one another in the area of an interface device 78 for exchanging hydraulic fluid.

Thereby, the housing part 76 constitutes a channel plate, and the housing part 77 constitutes a valve plate of the actuating device 1, between which an intermediate plate 78 acting as an interface device is inserted, by which the transfer points between the valve plate 76 and the channel plate 77 can vary with little effort in a cost-effective manner. The actuating device 1 or its housing 75 constitutes a so-called "assembly unit" or a module that can be used for a multitude of different transmission derivatives of a dual-clutch transmission and the housing parts 76 and 77 of which can be equipped with the steering and control components required to supply the transmission components of the transmission 2, and are designed with the hydraulic lines required for this. The adaptation of the actuating device 1 to the respective transmission concept is effected by the interface device 78 provided between the housing parts 76 and 77.

Figure 4:
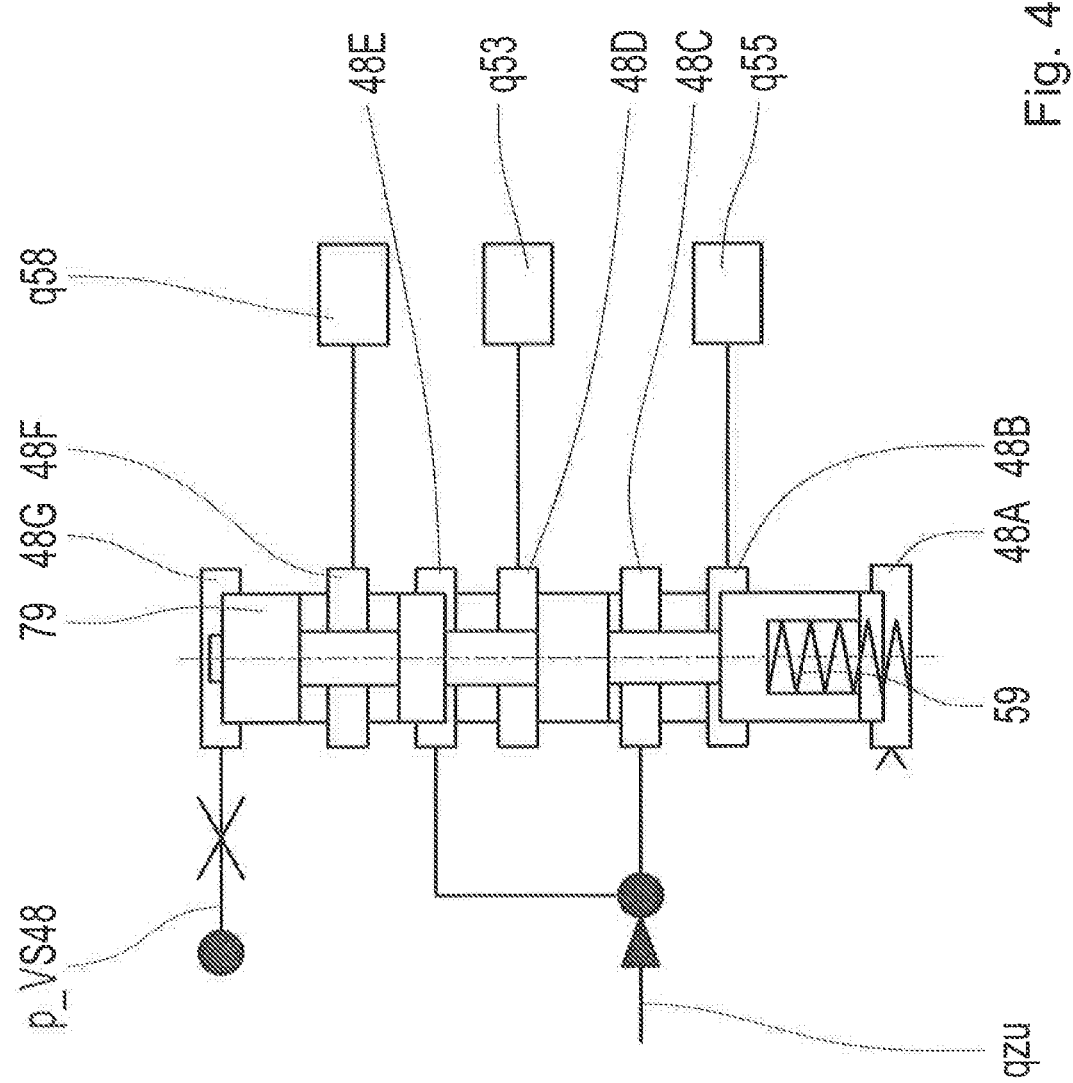
FIG. 4 a view of the valve device corresponding to FIG. 3 according to FIG. 3 in a second operating state.
Figure 5:
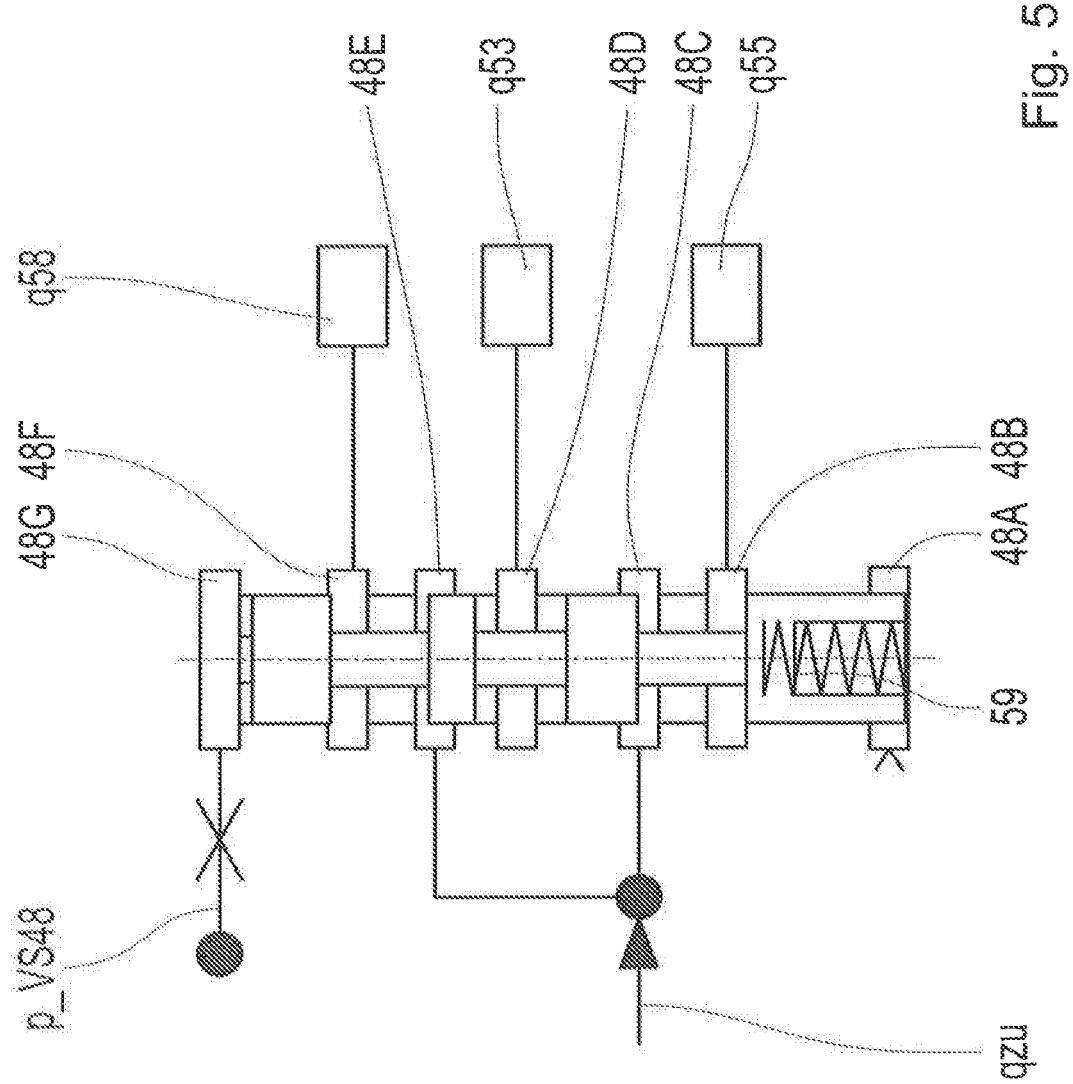
FIG. 5 the valve device according to FIG. 3 in a third operating state.

Each of FIG. 3 through FIG. 5 shows a structural design of the cooling valve 48 of the actuating device 1 according to FIG. 1, through which the quantity of hydraulic fluid volume qzu guided through the system pressure valve 47 in the direction of the cooling valve 48 can be distributed, almost arbitrarily, between the three outlet lines of the cooling valve 48. The cooling valve 48 constitutes a so-called "current divider," by which one of the three output lines is not always supplied with hydraulic fluid volume. Since, for the current divider or the cooling valve 48, it is always the case that only the quotient between two line resistances is effective, an additional pressure increase through the distributor switch —assuming sufficiently large channel cross-sections—does not take place. In order to, to the desired extent, distribute the volume flow of hydraulic fluid qzu, which is provided by the system pressure valve 47, between the first area 53 of the system pressure circuit 54, the second area 55 of the secondary pressure circuit 54 and the line 58 through which the suction charging of the two pump units 43 and 44 takes place, the valve switch shown in FIG. 3 through FIG. 5 is proposed.

In the present case, the cooling valve 48 is formed with seven valve pockets 48A through 48G, whereas, through the continuous pressing of the valve pocket 48G, starting from the pilot pressure control valve 60 with the pilot pressure p_VS48, a valve slide 79 of the cooling valve 48 is continuously displaced against the spring device 59. In the position of the valve slide 49 shown in FIG. 3, the volume flow of hydraulic fluid qzu, which is provided in the area of the valve pocket 48E, is forwarded completely in the direction of the valve pocket 48D and thus the first area 53 of the secondary pressure circuit 54. This means that the suction charging is not provided with hydraulic fluid volume by the line 58, and the cooling of the dual-clutch system 56 is not provided with hydraulic fluid volume by the cooling valve 48. FIG. 4 shows an intermediate position of the valve slide 79, while, in the view according to FIG. 5, the valve slide 79 is completely pushed into its second end position by the pilot pressure p_VS48 counter to the spring force of the spring device 59.

Figure 6:
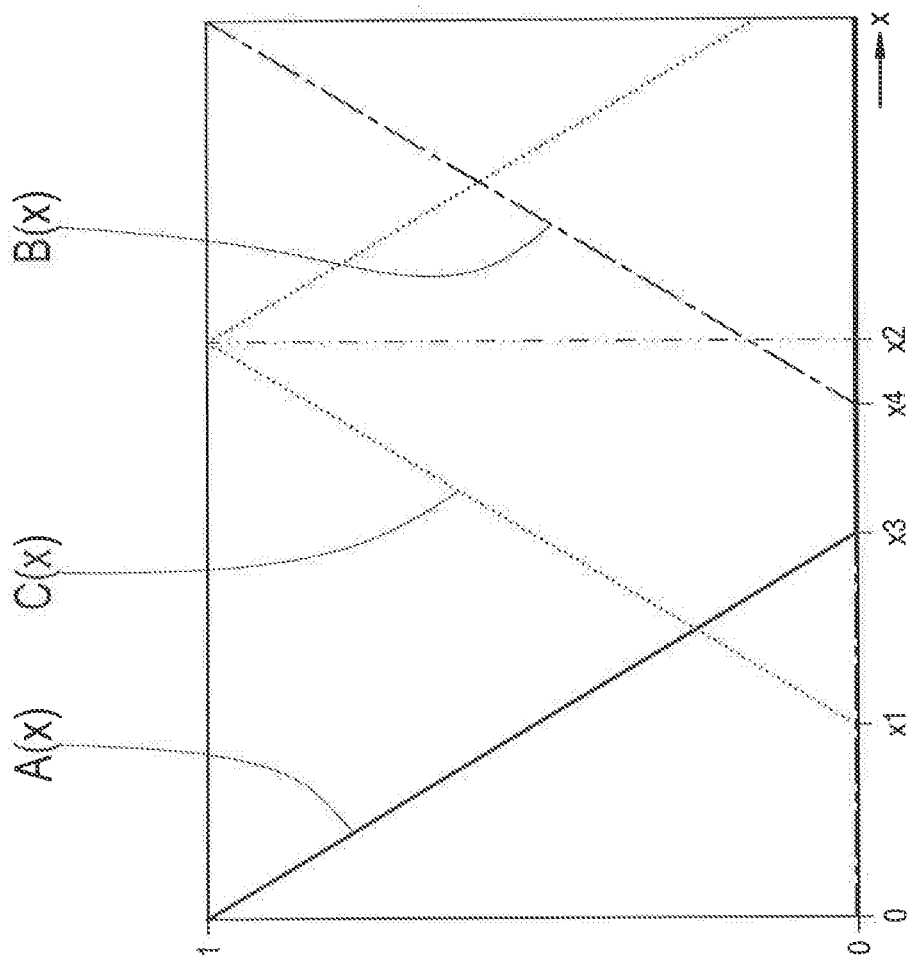
FIG. 6 multiple progressions of opening surfaces that can be released by a valve slide of the valve device according to FIG. 3, over an actuating path of the valve slide between a first end position and a second end position of the valve slide.

FIG. 6 shows an opening characteristic of the cooling valve 48, whereas the function A(x) designates an opening surface of the cooling valve 48 between the valve pockets 48E and 48D, which can be released by the valve slide 79, while x corresponds to the actuating path of the valve slide 79. The additional function B(x) in turn corresponds to the opening surface between the valve pockets 48E and 48F, which can be released by the valve slide 79, while the function C(x) corresponds to the opening surface of the cooling valve 48, which is adjusted across the actuating path x of the valve slide 79, in the area between the valve pockets 48C and 48B.

In the initial position shown in FIG. 3 of the cooling valve 48 or the valve slide 79, as the case may be, in the area of the cooling valve 48, only the opening surface A(x) between the valve pockets 48E and 48D is initially opened in the direction of the gear set cooling or the first area 53, as the case may be. With an increasing actuating path x of the valve slide 79, starting from the first end position shown in FIG. 3, in the direction of the second end position shown in FIG. 5, the opening surface A(x) decreases monotonically. If the valve slide 79 is displaced from the first end position by the actuating path value x1, a passage in the area of the cooling valve 48 in the direction of the cooling of the dual-clutch system 56 also opens for the first time, which is why the progression C(x) increases. The opening characteristic of C(x) is initially monotonically increasing. Only if the valve slide 79 is displaced from the first end position by the actuating path value x2 does the opening characteristic of C(x) in turn monotonically decrease with a further increasing actuating path of the valve slide 79.

With the structural design of the cooling valve 48 shown in FIG. 3 through FIG. 5, the inlet in the area of the valve pockets 48E and 48C is never connected simultaneously with the valve pockets 48F and 48D. This aspect can also be seen in the view according to FIG. 6, since the opening surface A(x) is already equal to 0 starting from an actuating travel value x3, at which the opening surface B(x) is also completely closed by the valve slide 79. Only starting from an actuating travel value x4 does the opening surface B(x) increase monotonically, which is completely released by the valve slide 79, if this has reached its second end position shown in FIG. 5. In the second end position of the valve slide 79, however, the opening surface C(x) is not completely blocked by the valve slide 79.

In the intermediate position of the valve slide 79 shown in FIG. 4, the volume flow of hydraulic fluid qzu applied in the area of the valve pockets 48E and 48C is forwarded, essentially in the same parts, in the direction of the first area 53 and in the direction of the cooling of the dual-clutch system 56. Due to the special design of the inner feed pockets or the valve pockets 48E and 48C, the stationary flow forces acting on the valve slide 79 is almost completely compensated at this working point.

The distribution of the volume flow of hydraulic fluid qzu applied in the area of the valve pockets 48E and 48C in the direction of the first area 53, in the direction of the cooling of the dual-clutch system 56 and in the direction of the line 58 or the suction charging can be represented mathematically by the following equations:

$$q53 = \frac{A(x)}{A(x) + B(x) + C(x)} qzu$$

$$q58 = \frac{B(x)}{A(x) + B(x) + C(x)} qzu$$

$$q55 = \frac{C(x)}{A(x) + B(x) + C(x)} qzu$$

Thereby, the function q53 corresponds to the volume flow of hydraulic fluid that can be guided in the direction of the first area 53 by the cooling valve 48 as a function of the volume flow of hydraulic fluid qzu supplied to the cooling valve 48 by the system pressure valve 47. The function q58 is the volume flow of hydraulic fluid supplied to the suction charging 58, while the function q55 corresponds to the volume flow of hydraulic fluid that is provided for the cooling of the dual-clutch system 56 as a function of the current actuating path x of the valve slide 79 of the cooling valve 48.

Figure 7:
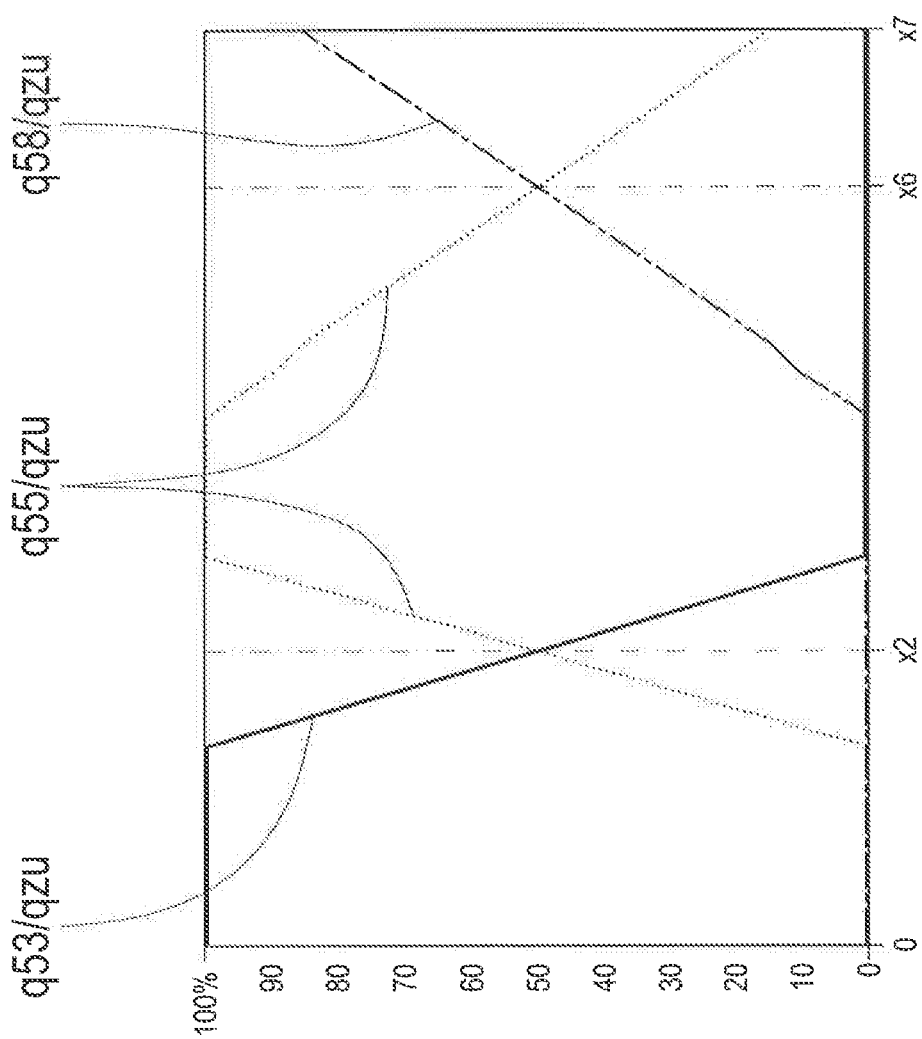
FIG. 7 progressions of different degrees of distribution of a volume inflow of hydraulic fluid of the valve device according to FIG. 3 over the actuating path of the valve slide of the valve device.

In FIG. 7, each of the normalized curves q53/qzu, q55/qzu and q58/qzu is shown across the actuating path x of the valve slide 79 of the cooling valve 48. The view according to FIG. 7 shows, for example, that, upon reaching the second end position of the valve slide 79, that is, upon the presence of an actuating travel value x7, a splitting of the volume flow of hydraulic fluid qzu supplied to the cooling valve 48 takes place in the direction of the suction charging 58 and the cooling of the dual-clutch system 56 in a defined ratio, in the present case approximately 85% in the direction of the suction charging and approximately 15% in the direction of the cooling of the dual-clutch system 56. Upon the presence of an actuating path value x6, the flow in the direction of the suction charging 58 is throttled in the area of the valve pocket 48D, and at the same time a hydraulic fluid volume is guided in the direction of the cooling of the dual-clutch system 56. In this position of the valve slide 79, in contrast to a position of the valve slide 79 corresponding to an actuating path x2, there is no automatic compensation of the flow forces acting on the valve slide 79.

In principle, the sum of all three opening surfaces A(x), B(x) and C(x) describes the hydraulic equivalent resistance of the cooling valve 48. With suitably sized valve pockets or a correspondingly dimensioned valve diameter, the equivalent resistance of the cooling valve 48 can be reduced as desired. Independent of this, the valve slide 79 of the cooling valve 48 features the identical diameter in the area of the through-flow pockets 48B through 48E.

The embodiment of the hydraulic actuating device 1 shown in FIG. 1 is suitable for supplying the components of the transmission 2 or of the dual-clutch transmission, as the case may be, since the transmission 2 can be supplied with hydraulic fluid from the two mutually independent pump units 43 and 44. The first pump unit 43, which is a controlled vane cell pump, is coupled with the engine rotational speed, while the second pump unit 44, which is a constant pump, is coupled with the output shaft of the transmission 2. In principle, this structural design enables four different operating modes.

During a first operating mode, at which a drive unit that can be coupled with the transmission input shaft is in operation, the first pump unit 43 conveys hydraulic fluid volume, while the second pump unit 44 does not provide a conveying volume if the vehicle is stationary at the same time. During a second operating mode, during which the drive unit is switched off during vehicle standstill, hydraulic fluid volume is not provided either by the first pump unit 43 or by the second pump unit 44. The second operating mode corresponds, for example, to a parking mode or a stop in front of a traffic light. A third operating mode of a vehicle is characterized in that the vehicle is moved at a vehicle speed greater than zero and the drive unit is switched on, such that hydraulic fluid volume is conveyed by both the first pump unit 43 and the second pump unit 44. In contrast to this, during a fourth operating mode, which is also referred to as coasting mode and during which the drive unit is switched off at a vehicle speed greater than zero, hydraulic fluid volume is only provided by the second pump unit 44.

Through the shifting diagram shown in FIG. 1, the second pump unit 44 is used for supplying lubricating oil lines for the gear set and for cooling the four-wheel clutch 68 if a vehicle is operated in the first or third operating mode. Thereby, the hydraulic resistances of the associated connecting lines are reduced to a structurally possible minimum, by which the hydraulic power consumption of the second pump unit 44 is also low.

In coasting mode, hydraulic power is not consumed in the area of the first pump unit 43. In addition, the drive unit, which is usually designed as an internal combustion engine, is also free of power. Through the electrical control of the pilot pressure control valve 60, an auxiliary hydraulic resistance can be activated, which significantly increases the conveying pressure level of the second pump unit 44. By this measure, the second pump unit 44 can also be used for the actuation of the transmission 2 in the coasting mode, for instance, for gear tracking.

In the first operating mode, at which the drive unit is switched on and the vehicle is essentially at a standstill, excess hydraulic fluid volume initially conveyed by the first pump unit 43 is guided in the direction of the first area 53 or of the gear set cooling, whereas, for this purpose, the cooling valve 48 is located in the initial position shown in FIG. 1. This offers the advantage that, for example, if the vehicle is cold-started, the dual-clutch system 56 is initially not subjected to cooling oil, and no additional drag torque can build up, which can have negative effects, for example, if the gears are engaged in the transmission 2.

In the third operating mode, the cooling valve 48 is, as a rule, transferred into its third shifting position, in which the dual-clutch system 56 is subjected to cooling oil by the first pump unit 43, while the gear set cooling of the first area 53 of the secondary pressure circuit 54 is supplied with hydraulic fluid volume starting from the second pump unit 44. The retaining valve 66 is completely opened, since, like the cooling valve 48, it is subjected to the pilot pressure p_VS48 starting from the pilot pressure control valve 60. This measure advantageously leads to the second pump unit 44 or the gear set pump, as the case may be, having to convey only against very low hydraulic resistances. The non-return valve device 65 or the bridge valve, as the case may be, is closed during the last-described operating state of the hydraulic actuating device 1, since the system pressure p_sys generated in the area of the first pump unit 43 is greater than the pressure upstream of the retaining valve 66. An additional non-return valve device 80, which is also referred to as a gear set pump valve, operates as a safety valve if the vehicle starts backwards, since the second pump unit 44 thereby changes or switches its direction of flow due to the opposing drive.

During special operating states of the vehicle drive train designed with the transmission 2, during which additional cooling oil quantities are required in the area of the gear set of the transmission 2, because, for example, the volume flow conveyed proportionally to the vehicle speed in the area of the second pump unit 44 is not sufficient for a required cooling and lubrication of the gear set, the cooling valve 48 is transferred into its second shifting position, in which the system pressure valve 47 is connected by the cooling valve 48 both to the first area 53 and to the second area 55 of the secondary pressure circuit 54.

In the fourth operating mode of the vehicle drive train designed with the transmission 2, the cooling valve 48 is located in its first shifting position, in which the valve slide 79 is completely pushed by the spring device 59 into the first end position shown in FIG. 1. The retaining valve 66 then operates without applied pilot pressure p_VS48 and adjusts a defined pressure level in the area of the pressure side 64 of the second pump unit 44, which pressure level is largely independent of the conveying flow of the second pump unit 44. By the bridge valve 80, the system pressure channel of the first pump unit 43 and, in particular, the pressure-reducing valve 25 connected to the electromagnetic pressure regulators or the pilot pressure control valves 26, 27, 60 and 81 through 85 along with the magnetic valves 19 through 21 are provided with hydraulic fluid volume starting from the second pump unit 44. Thus, for example, the piston/cylinder devices 3 through 7 along with the dual-clutch system 56 can be subjected to and actuated with hydraulic fluid by the second pump unit 44, which is possible due to the falling drive characteristic of the retaining valve 66 shown in FIG. 8.

Figure 8:
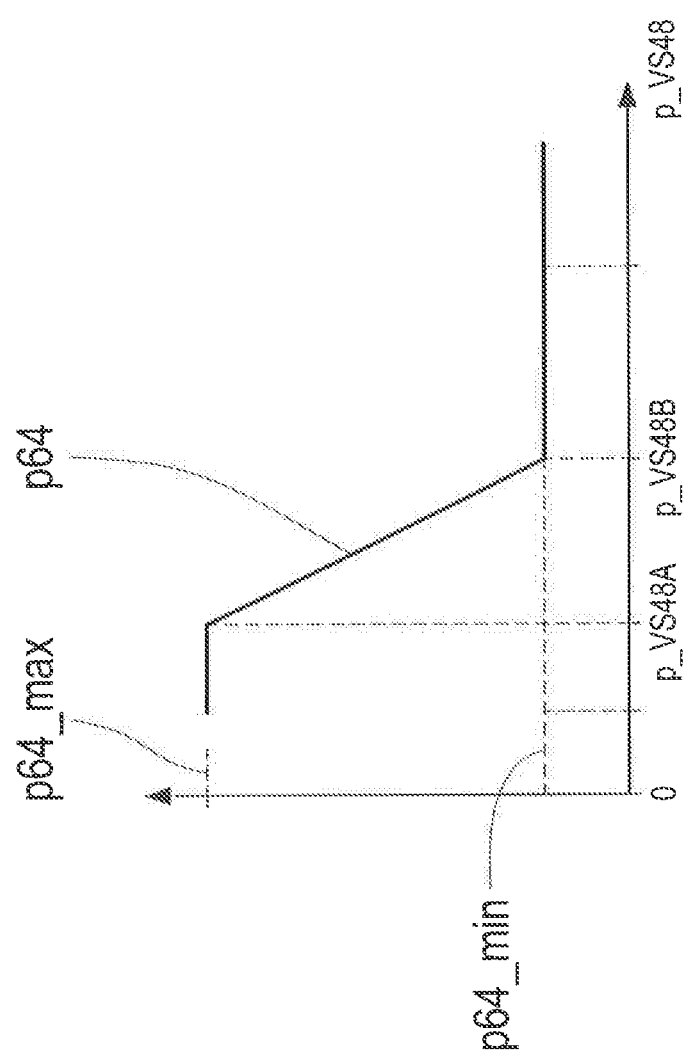
FIG. 8 a stationary characteristic curve of a steering and control component, designed as a retaining valve; of the hydraulic actuating device according to FIG. 1.

FIG. 8 shows a stationary characteristic curve of the retaining valve 66 across the pilot pressure p_VS 48, which is adjustable in the area of the pilot pressure control valve 60. The view according to FIG. 8 shows that a pressure p64 upstream of the retaining valve 66 has a maximum value p64_max up to a pilot pressure p_VS48A. With increasing pilot pressure values p_VS48, the pressure p64 decreases progressively up to a second pilot pressure value p_VS48B and has its minimum p64_min starting at the pilot pressure value p_VS48B.

Figure 9:
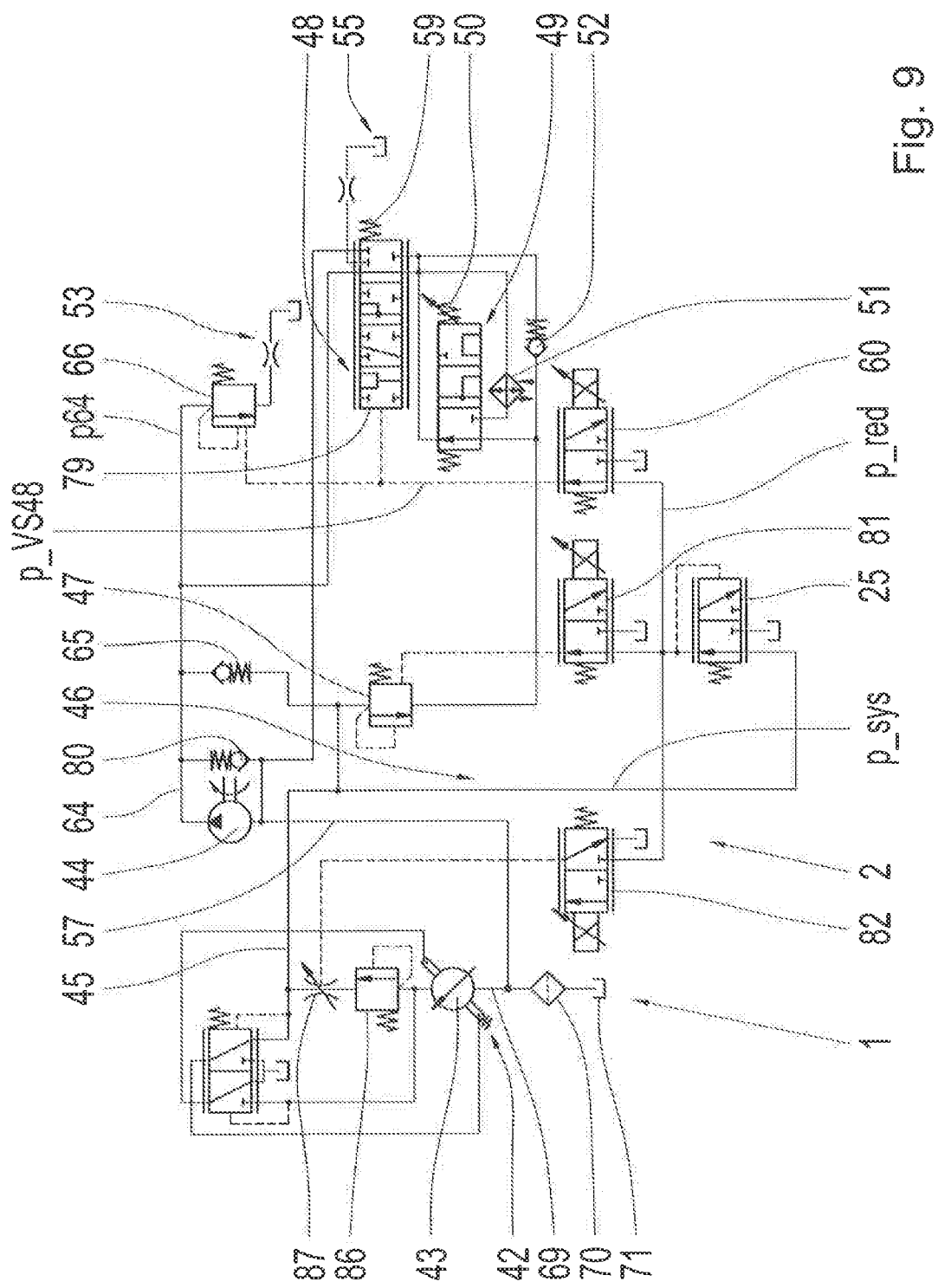
FIG. 9 a partial area of a hydraulic diagram of an additional form of the first embodiment of the hydraulic actuating device in accordance with exemplary aspects of the invention according to FIG. 1.

As an alternative to the view according to FIG. 1, as shown in FIG. 9, it can also be provided that the cooling valve 48, by the retaining valve 66, is in operative connection or can be brought into operative connection with the first area 53 of the secondary pressure circuit 54. This advantageously leads to, under certain circumstances, the system pressure p_sys being built up somewhat more rapidly in the area of the primary pressure circuit 46 during a start of the drive unit. The retaining valve 66 is then in its initial position. At a pilot pressure p_VS48 essentially equal to zero and without a flow in the area of the retaining valve 60 then present in the closed operating state, a volume flow of hydraulic fluid provided by the cooling valve 48 upstream of the retaining valve 66 is initiated in a manner greater than or equal to its response limit in the primary pressure circuit 46.

Figure 10:
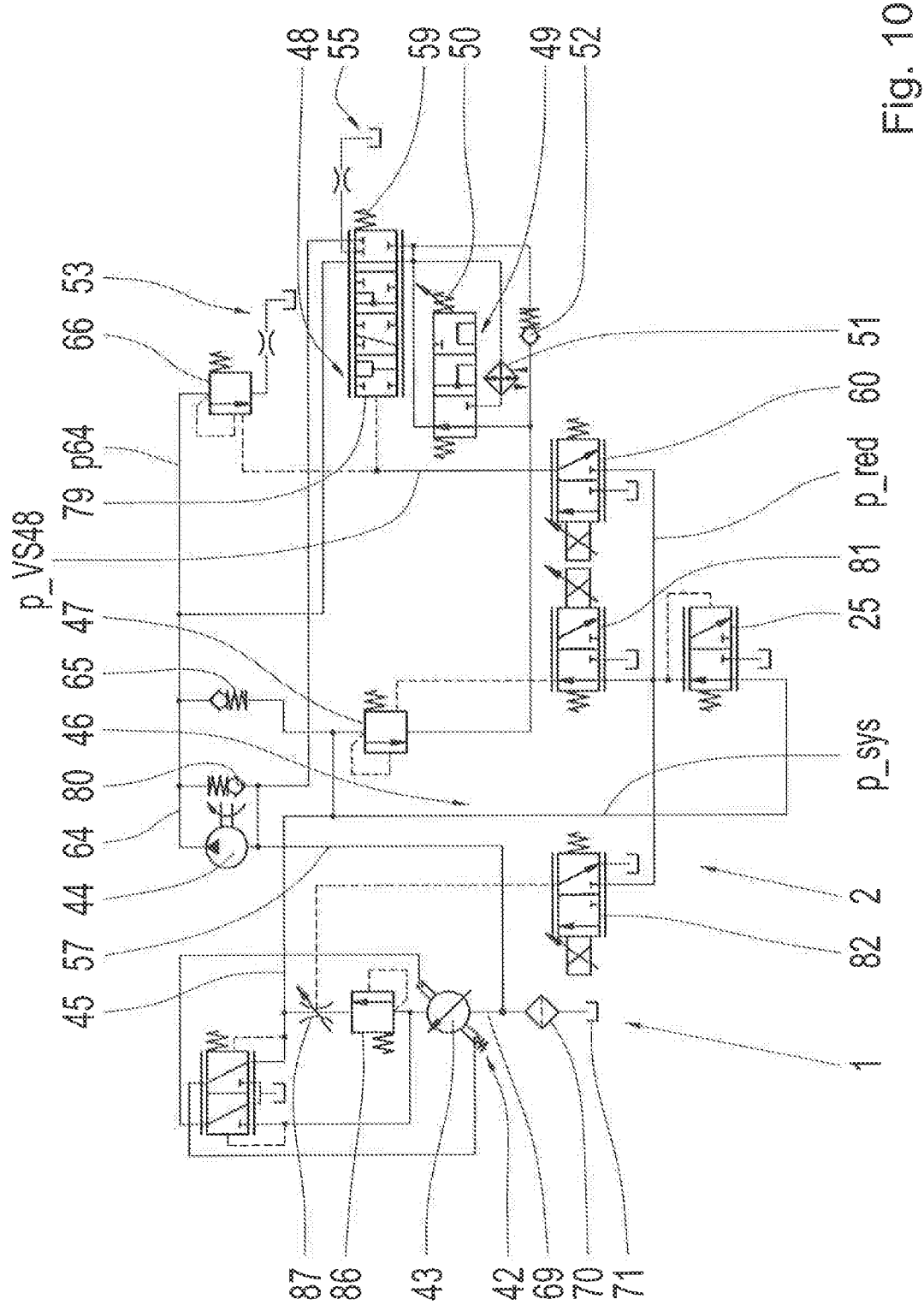
FIG. 10 a view corresponding to FIG. 9 of an additional embodiment of the hydraulic actuating device in accordance with exemplary aspects of the invention according to FIG. 1.

FIG. 10 shows an additional form of the embodiment of the hydraulic actuating device 1 according to FIG. 1, with which the pilot pressure control valve 60 is a pressure regulator with an increasing current/pressure characteristic curve. This offers the advantage that, in the event of an electrical or mechanical failure of the pilot pressure control valve 60, the cooling of the dual-clutch system 56 is not activated, which is the case with the design of the actuating device 1 according to FIG. 1. In addition, upon the electrical or mechanical failure of the pilot pressure control valve 60, in addition to the cooling of the dual-clutch system 56, the suction charging is activated. The use of a pressure regulator with an increasing current/pressure characteristic curve enables, depending on the particular application under certain circumstances, a more rapid production of vehicle availability.

Figure 11:
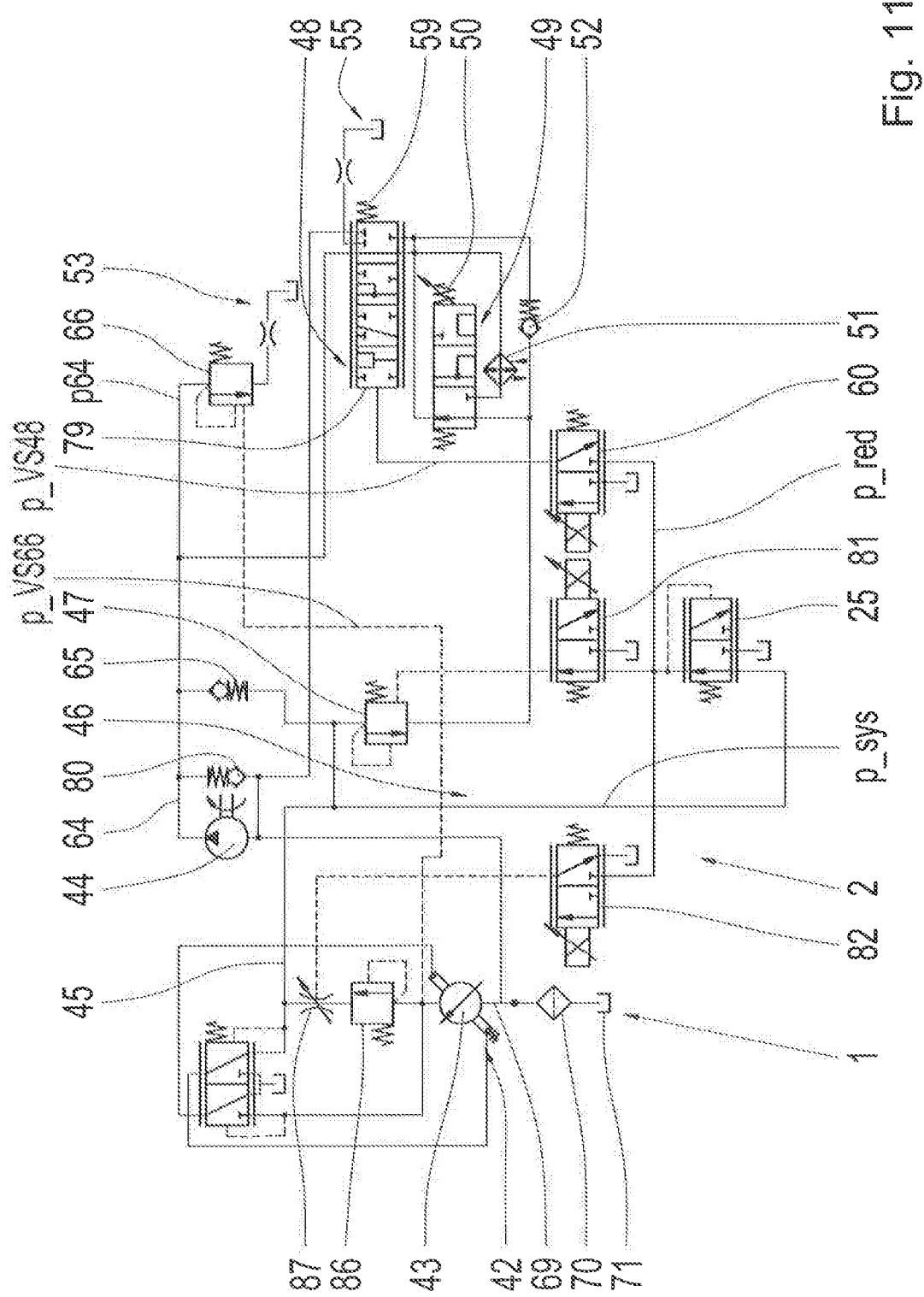
FIG. 11 a view corresponding to FIG. 9 of an additional embodiment of the hydraulic actuating device in accordance with exemplary aspects of the invention according to FIG. 1.

With an additional embodiment of the hydraulic actuating device 1 according to FIG. 1 shown in FIG. 11, the retaining valve 66 is pilot-controlled with a pressure signal that is otherwise provided, whereas the pilot pressure p_VS66 that can be applied in the area of the retaining valve 66 corresponds to the pressure that is present between the first pump unit 43 and a so-called "separating valve" 86, which is designed as a pressure-limiting valve.

This design of the actuating device 1 offers the advantage that, without further auxiliary measures, for example by an internal line of the control device, the retaining valve 66 is always adjusted to its maximum pressure level if the conveying pressure of the first pump unit 43 drops. In particular, at low operating temperatures of the transmission 2 and thus also of the hydraulic fluid used in the area of the hydraulic actuating device 1, the cooling of the gear set of the transmission 2, by the first area 53 of the secondary pressure circuit 54, does not cause negligible drag torques.

For this reason, the procedure described in more detail below attempts to adjust the conveyed volume flow of hydraulic fluid of the pump device 42 (that is, the first pump unit 43 and the second pump unit 44) in a controlled manner such that the required volume flow of cooling oil for the gear set corresponds to the volume flow of hydraulic fluid provided by the first pump unit 43 and the second pump unit 44. The volume flow of cooling oil that is respectively provided for the dual-clutch system 56 and the gear set is conveyed in the above-described scope by the adjustable vane-cell pump 43 that is driven on the engine side and the gear set pump 44 that is driven on the output side.

The flow rate of the gear set pump 44 is dependent on the speed of the vehicle in the scope described above, while the flow rate of the vane cell pump 53 can be regulated by an electromagnetic controllable pilot stage or the pilot pressure control valve 82, as the case may be. Furthermore, the entire available volume flow of hydraulic fluid of the two pump units 43 and 44 can be split by a corresponding control of the cooling valve 48 through the pilot pressure control valve 60. The splitting of the conveying volume of the pump units 43 and 44 provided is intended to ensure that the required volume flow of cooling oil of the transmission 2 in the area of the dual-clutch system 56 and of the gear set is equal to the conveying volume of the two pump units 43 and 44.

Both the volume flow of hydraulic fluid provided for the cooling of the dual-clutch system 56 and for the cooling of the gear set is delivered or conveyed by the two pump units 43 and 44 as a function of the control of the cooling valve 48 and of an aperture valve 87 provided downstream of the first pump unit 43, with varying degrees of splitting. For this purpose, the cooling valve 48 is correspondingly subjected to pilot pressure by the pilot pressure control valve 60, and the aperture valve 87 is correspondingly subjected to pilot pressure by the pilot pressure control valve 82.

If the cooling valve 48 is located in a so-called "center position," the volume flow of cooling oil of the first pump unit 43 is exclusively used for cooling the dual-clutch system 56, while the volume flow of hydraulic fluid conveyed by the second pump unit 44 for lubricating and cooling the gear set of the transmission 2 is fed to the first area 53 of the secondary pressure circuit 54. At high loads in the area of the dual-clutch system 56, with low loads of the gear set at the same time, the cooling valve 48 is transferred into the center position. If the valve slide 79 of the cooling valve 48 is located in its first end position, the volume flow of cooling oil guided by the cooling valve 48 in the direction of the dual-clutch system 56 is essentially equal to zero. At that point, the conveying volume of the vane cell pump 43 and the gear set pump 44 is used essentially completely for cooling the gear set and/or for lubricating the gear set of the transmission 2.

Figure 12:
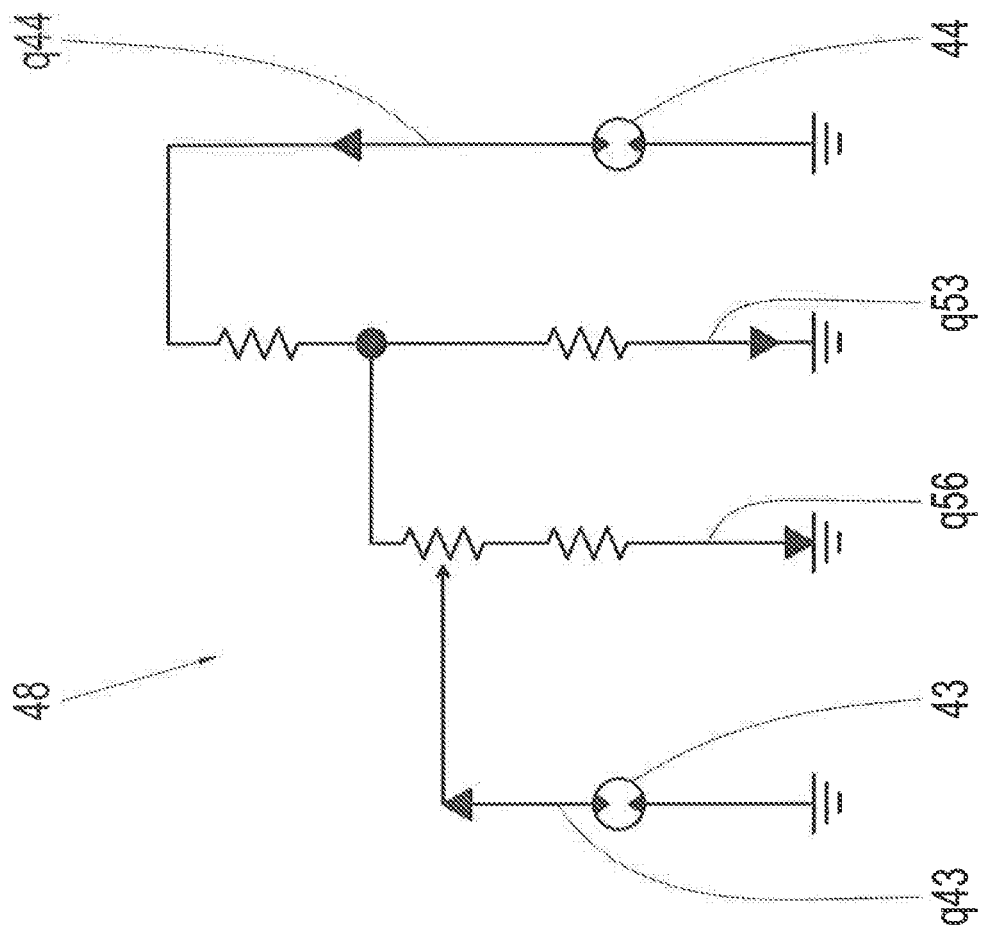
FIG. 12 a hydraulic equivalent circuit diagram of the valve device according to FIG. 3 through FIG. 5 for a transmission with two hydraulic pumps and a common oil chamber.

The cooling valve 48 constitutes a so-called "current divider," which is supplied by two pressure sources. FIG. 12 shows an equivalent circuit diagram of the cooling valve 48, which is subjected to a respective volume flow of hydraulic fluid q43 or q44 by the two pump units 43 and 44. The inflow of the cooling valve 48 is provided in the direction of the first area 53 as an outflowing volume flow of hydraulic fluid 53 and in the direction of the dual-clutch system 56 in the form of the outflowing volume flow of hydraulic fluid q56. The two volume flows of hydraulic fluid q43 and q44, which flow into the cooling valve 48, are forwarded in the direction of the dual-clutch system 56 and the gear set by the first area 53, as a function of the position of the valve slide 79 of the cooling valve 48 with varying degrees of distribution. The respectively required volume flow of cooling oil q56 and q53 for the dual-clutch system 56 and the gear set of the transmission 2 is determined by a thermal model. In addition, the conveying volume of the gear set pump 44 is constantly calculated as a function of temperature and travel speed.

Figure 13:
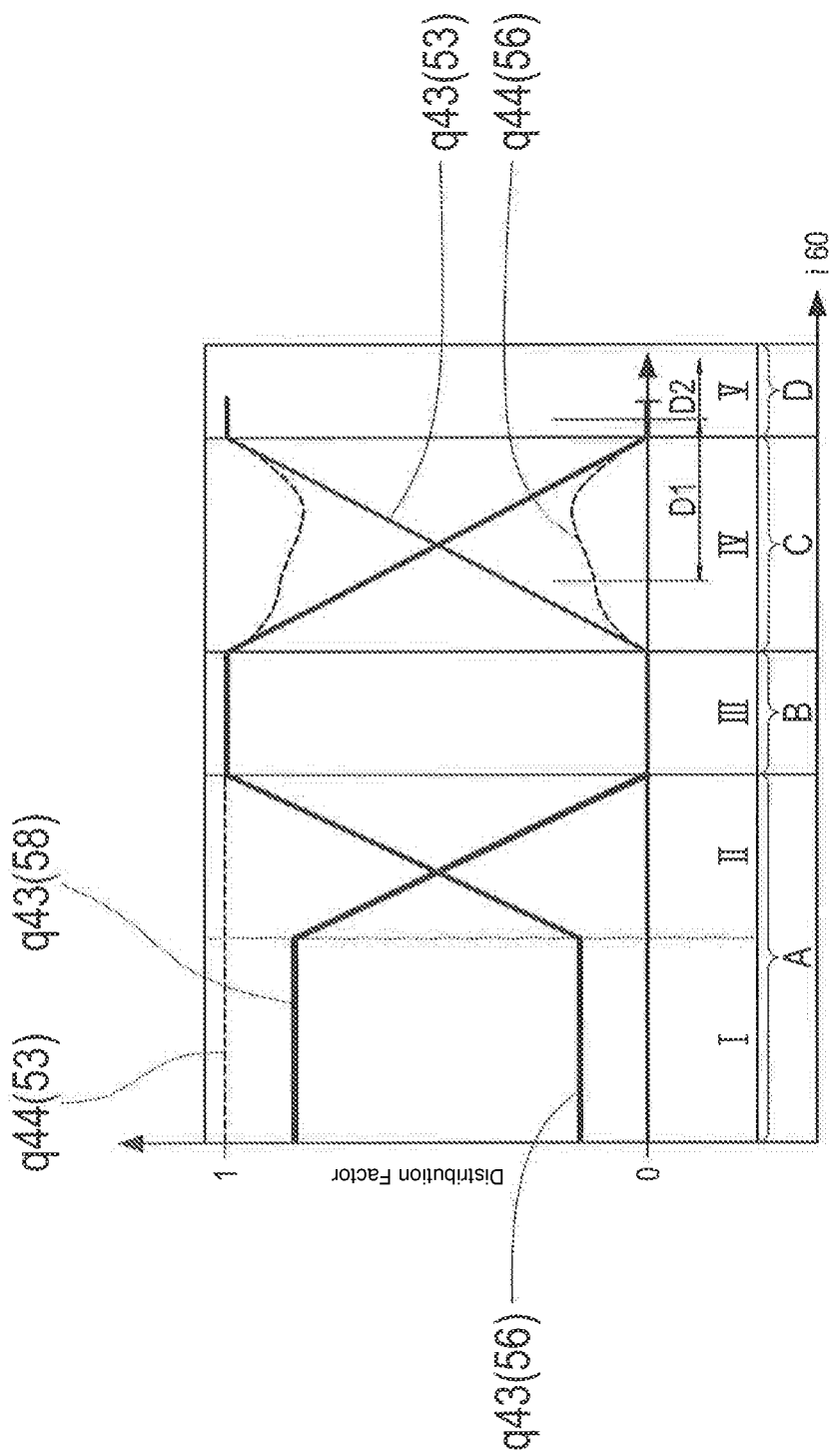
FIG. 13 multiple progressions of distribution factors of a volume inflow of hydraulic fluid of the valve device according to FIG. 12 across an actuating current of an electrohydraulic actuator allocated to the valve device.

Initially, the optimum control range of the cooling valve 48 is cyclically determined during driving operation. Thereby, the control areas A through D2, which are described in more detail below and are shown in FIG. 13 by an actuating current i60 of the pilot pressure control valve 60, are relevant. The control range A, which extends between an area of the actuating current i60 equal to zero and a first actuating current value i60A, is additionally subdivided into two additional operating ranges, which in the present case are designated as sub-control ranges. The first sub-control range of the control range A extends to an actuating current value i60A1, which is smaller than the actuating current value i60A. Up to the smaller actuating current value i60A1, the volume flow of hydraulic fluid q43 provided by the first pump unit 43 is discharged via the cooling valve 48, for the most part for the suction charging q43(58) of the two pump units 43 and 44 via the line 58. The smaller part q43(56) is forwarded in the direction of the second area 55 for the cooling of the dual-clutch system 46 via the cooling valve 48.

With increasing actuating current values i60, the hydraulic fluid volume q43 (58) provided for suction charging decreases steadily, while the volume fraction of hydraulic fluid q43 (56) provided for cooling the dual-clutch system 56 steadily increases in the second sub-control range of the control area A. If the pilot pressure control valve 60 is supplied with power with the actuating current value i60A, the entire hydraulic fluid volume q43 provided by the first pump unit 43 is directed in the area of the cooling valve 48 for the cooling of the dual-clutch system 56 in the direction of the second area 55 of the secondary pressure circuit 54. During the second control range B, which is connected to the first control range A, the hydraulic fluid volume q43 provided by the vane cell pump 43 is exclusively used for the cooling of the dual-clutch system 56, while the gear set of the transmission 2, both within the first control range A and within the control range B, is subjected to hydraulic fluid volume q44(53) for cooling and lubrication exclusively by the gear set pump 44.

As the actuating current i60 continues to increase, the valve slide 79 of the cooling valve 48 is also increasingly adjusted, and the cooling valve 48 is actuated within the third control area C, which in turn is directly connected to the second control range B. Within the third control range C of the cooling valve 48, the hydraulic fluid volume q43(56), which is guided by the vane cell pump 43 in the direction of the dual-clutch system 56, decreases steadily, while the hydraulic fluid volume q43 conveyed by the vane cell pump 43 is increasingly used for cooling the gear set by the area 53 of the secondary pressure circuit 54. The volume flow of hydraulic fluid q44, which is in turn provided by the gear set pump 44, is initially guided with increasing actuating current i60 in accordance with the progression q44 (53), increasingly to a lesser extent in the direction of the gear set and in accordance with the progression q44(56) in an increasing extent in the direction of the dual-clutch system 56. As the actuating current i60 continues to increase, the share q44(56) of the volume flow of hydraulic fluid q44 conveyed by the gear set pump 44 guided in the direction of the dual-clutch system 56 continues to decrease in the direction of zero, while the share q44(53) guided in the direction of the gear set of the transmission 2 increases again, until the entire volume flow of hydraulic fluid q44 conveyed by the gear set pump 44 is guided in the direction of the gear set. At the third control range C, the fourth control range D in turn follows, within which the volume flow of hydraulic fluid conveyed by the vane cell pump 43 and the gear set pump 44 is guided completely for the cooling of the gear set by the first area 53 of the secondary pressure circuit 54. Within the fourth control area D, there is no cooling of the dual-clutch system 56.

In addition, it may be provided that, in a control range D1, a pulse-width-modulated control is carried out in the area between actuating current values i60B and i60C. Within a control area D2 connected to the control area D1, a switching of the retaining valve 66 takes place.

Figure 14:
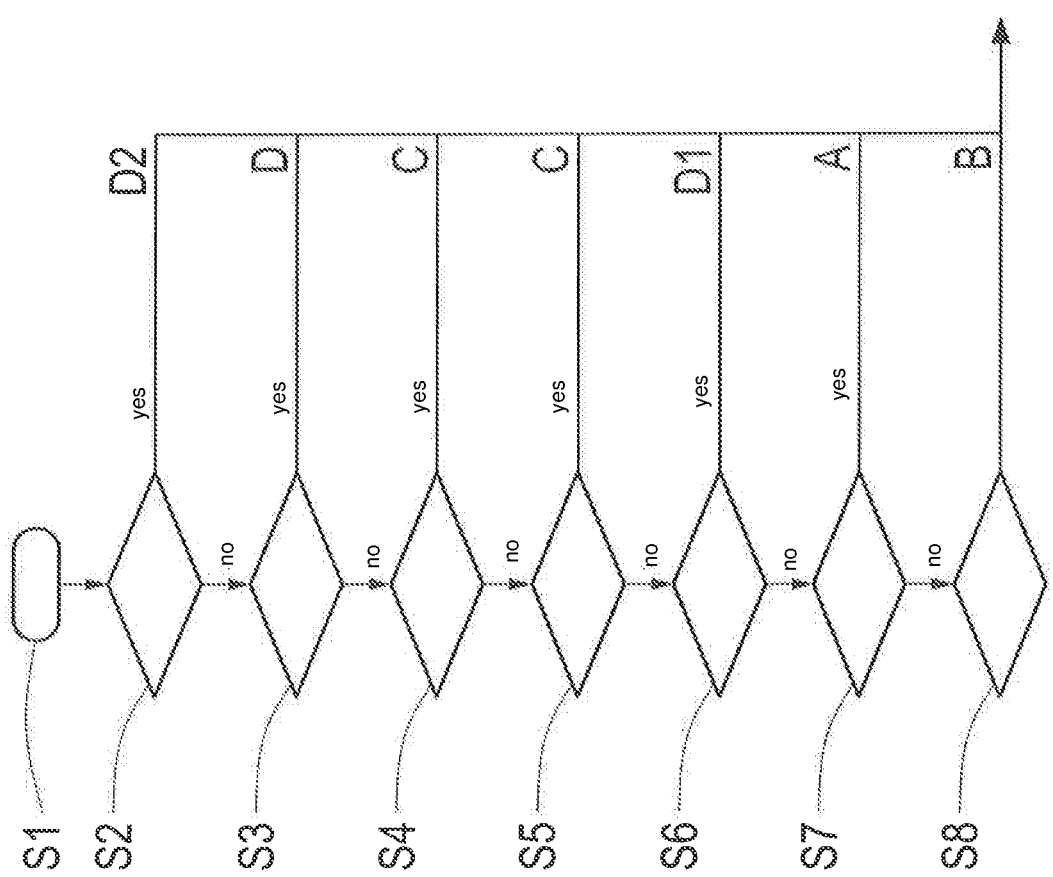
FIG. 14 a flow chart of a procedure for determining an optimum control range of the valve device according to FIG. 12.

In order to determine the respective optimum control area, which in each case is dependent on the operating state, the procedure shown in FIG. 14, which is activated in a first step S1, is carried out. During a first query step S2, a check is made as to whether, for example, the rotational speed of the drive unit is less than 400 rpm. If the query result is positive, the pilot pressure control valve 60 is supplied with power with a pilot pressure value greater than i60C, and the cooling valve 48 is operated within the control range D2. If the query result is negative, the first step S2 is branched into a second query step S3, during which a check is made as to whether the cooling of the dual-clutch system 56 is requested. If no corresponding request is present, the query step S3 branches into a third query step S4. However, if a corresponding request for cooling the dual-clutch system 56 is present, the cooling valve 48 is operated within the control range D.

During the third query step S4, upon a request for subjecting the gear set of the transmission 2 to a volume flow of hydraulic fluid, which is greater than the volume flow of hydraulic fluid currently available from the gear set pump 44, a check is made as to whether the vane cell pump 43 is currently conveying a volume flow of hydraulic fluid that is greater than that required for cooling the double clutch system 56. If the query result is positive, the cooling valve 48 is operated within the third control range C, while, if the query result is negative, the third query step S4 branches into a fourth query step S5, during which a check is made as to whether the dual-clutch system 56 can be subjected to hydraulic fluid volume starting from the gear set pump 44. Thereby, during the fourth query step S5, a check is made as to whether there is a need for cooling oil in the area of the dual-clutch system 56, which the gear set pump 44 can provide and which does not cause any sub-supply of the cooling of the gear set in the first area 53.

If the query of the fourth query step S5 leads to a positive query result, the cooling valve 48 is operated within the third actuating range C, while, in the case of a negative query result regarding the fifth query step S6, a check is made as to whether the volume flow of hydraulic fluid guided in the direction of the line 58 by the cooling valve 48 is so high that, in the area of the dual-clutch system 56, a requested cooling capacity is not reached. This is the case if the minimum volume flow, which is discharged by the line 58, is so high that the cooling of the dual-cooling system 56 is not carried out to the desired extent. In the case of a positive query result, the cooling valve 48 is operated within the control range D1.

In the case of a negative query result, during a sixth query step S7, a check is made as to whether the vane cell pump 43 conveys a greater volume flow of hydraulic fluid than is guided in the direction of the dual-clutch system 56 for its cooling. In the case of a positive query result of the sixth query step S7, the cooling valve 48 is operated within the first control range A, while, in the case of a negative query result, there is a branching into a branching step S8, which triggers the operation of the cooling valve 48 within the second control range B.

After the respective control area A through D2 of the cooling valve 48 has been determined by the above-described method, the need for conveying volume flow of the vane cell pump 43 is determined as a function of the respectively selected control range A through D2. The above-described manner of control of the cooling valve 48 enables a situation-dependent adjustment of the conveying capacity of the vane cell pump 43, and thus also of a consumption-optimized hydraulic power loss of the vane cell pump 43.

In principle, the cooling valve 48 is controlled in such a manner that the volume flow q56 guided in the direction of the dual-clutch system 56 and the volume flow q53 guided in the direction of the gear set, respectively, are adjusted in accordance with the following formulaic relationship:

$$q56 = f43 \cdot q43 + f44 \cdot q44$$

$$q53 = (q43 + q44) - q56$$

Figure 15:
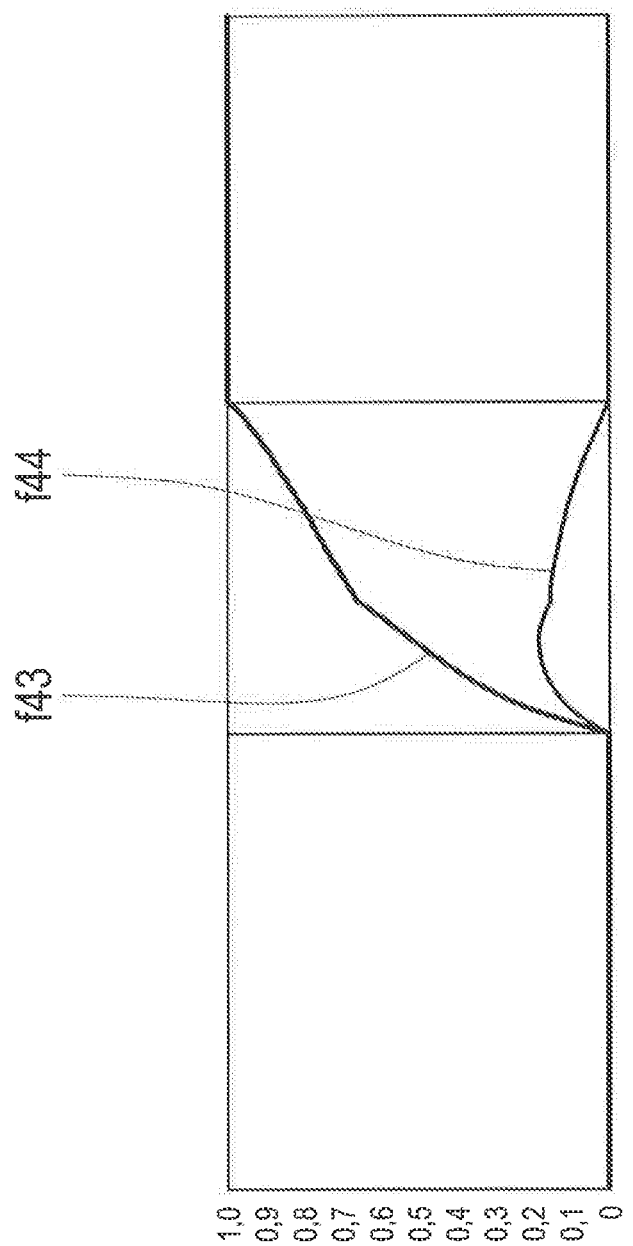
FIG. 15 characteristic curves of the hydraulic pumps as a function of an actuating path of the valve slide of the valve device according to FIG. 12 for the supply of a dual-clutch system of the transmission including the actuating device of FIG. 1.

Thereby, the formula symbol f43 corresponds to a distribution factor of the volume flow of hydraulic fluid q43 provided by the vane cell pump 43, and the formula symbol f44 corresponds to a degree of distribution of the volume flow of hydraulic fluid q44 provided by the gear set pump 44 in the direction of the dual-clutch system 56 across the actuating path of the valve slide 79 of the cooling valve 48. FIG. 15 shows progressions of the characteristic curves f43 and f44 of the vane cell pump 43 and the gear set pump 44 as a function of the position of the valve slide 79 of the cooling valve 48 for the supply of the dual-clutch system 56, whereas the factor f43 assumes values between 0 and 1 and the factor f44 assumes values between 0 and approximately 0.2.

In order to determine the actuating current i60 to be applied in each case in the area of the pilot pressure control valve 60 for adjusting the requested position of the valve slide 79 of the cooling valve 48, the procedure described in more detail below can be carried out.

The volume flow of hydraulic fluid q43 to be provided by the vane cell pump 43 at the optimum operating point is determined from the sum of the volume flow of cooling oil q56 required for cooling the dual-clutch system 56 and the volume flow of cooling oil q53 to be provided for cooling the gear set, whereas the volume flow of hydraulic fluid q44 provided by the gear set pump 44 is still subtracted from this. Subsequently, the characteristic curves f43 and f44 from FIG. 15 are traversed with the optimum volume flow of hydraulic fluid of the vane cell pump 43 and the volume flow provided by the gear set pump 44. In turn, at various positions of the pilot pressure control valve 60, a subsequent check is made as to whether the following matrix can be calculated:

$$\begin{pmatrix} q56 \\ q53 \end{pmatrix} = \begin{pmatrix} f43 & 1-f44 \\ 1-f43 & f44 \end{pmatrix} \cdot \begin{pmatrix} q43 \\ q44 \end{pmatrix}$$

In this case, the first bracket constitutes the so-called "distributor matrix" of the cooling valve 48. If the condition of the matrix cannot be fulfilled, the control of the pilot pressure control valve 60 takes place in accordance with the above-described first special case, during which the cooling valve 48 is located in the so-called "central position," which is controlled in particular upon high clutch loads and low gear set loads in the area of the transmission 2.

This procedure is carried out until the condition imposed by the matrix is fulfilled, whereas the position of the valve slide 79 of the cooling valve 48, which is to be adjusted as a function of the respective operating state, can be determined with little effort by an interpolation.

In principle, the strategy for the control of the pilot pressure control valve 60 is such that the volume flow of cooling oil provided by the vane cell pump 43 is reduced to a minimum, since the vane cell pump 43 operates at a higher pressure range than the gear set pump 44. This leads to a reduction in the losses in the area of the two pump units 43 and 44. In addition, the volume flow of cooling oil of the gear set pump 44 for cooling the gear set in the first area 53 is minimized, in order to reduce drag torque. The excess volume flow of hydraulic fluid provided by the gear set pump 44 is used to cool the dual-clutch system 56.

In order to prevent the emptying of hydraulic lines, the clutch valves 62 and 63 along with an additional clutch valve 88 allocated to the hang-on clutch 68 are in operative connection with so-called "pre-filling valves" 89 and 90. Typically, a multiple number of pressure control valves of hydraulic actuating devices of transmissions share a common pre-filling valve. In the area of the pre-filling valves, a certain minimum pressure in hydraulic lines is adjusted, whereas typical values between 0.2 to 0.4 bar are present. In terms of structure, they are usually designed as spring-loaded seat valves, such as plate valves. Pre-filling valves themselves can regulate the constant pre-filling pressure only if a defined minimum flow rate at the associated hydraulic control volume is present. If the minimum flow is reached, for example, by associated valve leakages, the associated pressure level is not defined shortly after a start of the drive unit (for example).

For reasons of installation space and costs, it is also typically the case that there are efforts to minimize the number of pre-filling valves. However, this disadvantageously leads to the fact that the associated network topology is significantly more complex, since at least two, often up to five, pressure control valves are to be connected to a common channel, which in turn is connected to the oil sump, for example the oil chamber 71, by a corresponding pre-filling valve. Thus, a reduction in the number of components is achieved with a more complex line guidance. If the associated pilot stage or the respective associated pilot pressure control valve is not supplied with power, the pre-filling pressure level is always applied by the associated actuator.

Hydraulic actuating devices that are so far known, which are designed with as few pre-filling valves as possible for a multiple number of pressure control valves, have the following disadvantages, among others:

Since the actuators, the clutches, the shift cylinders and the like are emptied by the pre-filling lines, the associated line cross-sections have relatively large dimensions by comparison. In addition, the pre-filling lines cross the entire housing of the actuating device, depending on the number of valves connected. The installation space required for this is disadvantageously no longer available for the unbundling of the remaining network topology.

In addition, it is disadvantageous that the line resistances that are effective despite the large channel cross-sections at low operating temperatures cause significantly extended discharge times in the area of the clutches. Depending on how far the tank connection of a 3/2-pressure control valve is distant from the associated pre-filling valve, such emptying periods can also be significantly scattered. For this reason, the temperature range for emptying processes may impair the spontaneity of individual gearshifts to a negligible extent. Moreover, it is also disadvantageous that an active pre-filling required for reasons of accuracy causes leakage losses, which reduce overall efficiency.

When a clutch is opened, that is, upon the rapid emptying of at least one of the connected pressure control valves by a pre-filling valve, a short-term pressure increase occurs in the area of the pre-filling line. All other, preferably open clutches or gear actuators are then subjected to a higher pressure level by their common pre-filling pressure level. During such operating situations, a pressure sensor system cannot be calibrated (for example). If, in the area of the pre-filling lines, an active pre-filling as a function of the currently prevailing operating temperature of the hydraulic fluid volume is not provided, there is the possibility, disadvantageously, that the time span that elapses until the correct rebuilding of the pre-filling pressure may be significantly greater than 10 seconds. Thus, hardly any calibrating operations can be carried out, particularly at low operating temperatures of a transmission.

The clutch valves 62, 63 and 88 along with the pressure control valves 28 and 29 (e.g., additional pressure control valves) or the gear valves are designed as so-called "spring-loaded slide valves." This means that the valve slides of the control valves 62, 63, 88 or 28, 29, as the case may be, are guided against a mechanical end stop, without a corresponding control, through the associated pilot stage 83, 84, 85 or 26 or 27, as the case may be, by the respectively applied spring force. Thereby, the valve slides of the control valves 62, 63, 88 or 28 and 29, as the case may be, travel over comparatively large actuating paths, in order to ensure sufficient opening cross-sections between a tank connection of the control valves 62 through 29 and the associated pre-filling line. As soon as the associated pilot stages 83, 84, 85, as the case may be, in each case, apply a pilot pressure in the area of the control valves 62, 63 and 88, the valve slides must be displaced against the spring force from the currently present end position. In steering and control behavior, the large actuating paths cause significant dead times between the control signal and the point in time at which the required working pressure or clutch pressure is adjusted. Thereby, the spontaneity of the pressure build-up decreases, as the actuating path to be traveled through by the valve slide is greater.

Figure 16:
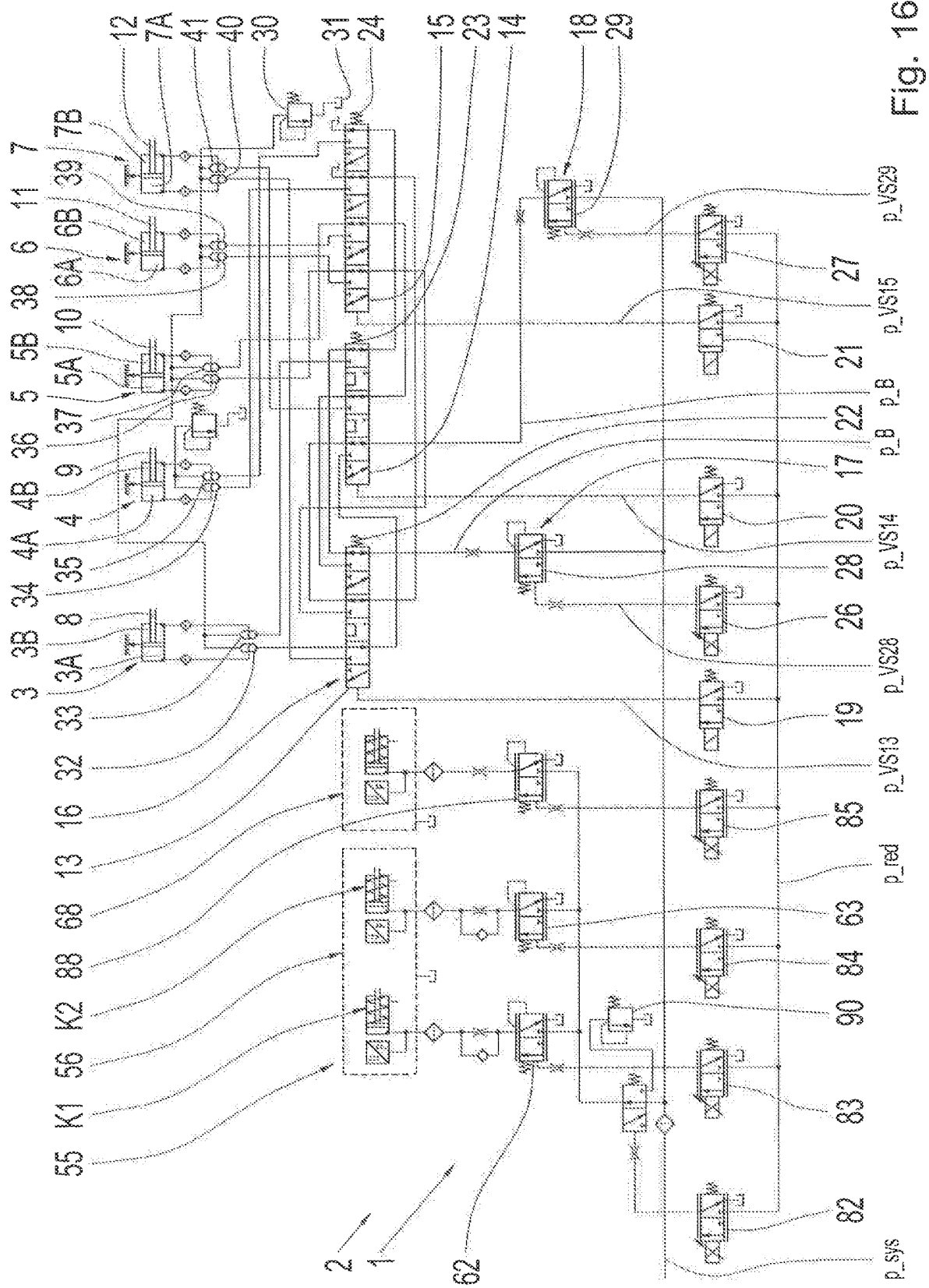
FIG. 16 one part of a hydraulic diagram of an additional embodiment of the hydraulic actuating device in accordance with exemplary aspects of the invention.

The above-described and essentially five main disadvantages are eliminated by a pre-filling valve integrated in a valve slide, or by a hydraulic topology of the hydraulic actuating device 1 shown in FIG. 16. Each of the pressure control valves 62, 63, 88 and 28, 29 is directly connected to the oil sump or to the common oil chamber. In terms of structure, such connection is designed directly in the corresponding cast pocket. In order to prevent the emptying in this area of the hydraulic actuating device 1, the pressure control valves 62 through 29 are designed in a manner shown in FIG. 16, with a spring device that has the same effect as the pilot pressure that can be applied. Thus, when the pilot pressure is not applied, in the area of the pressure control valves 62 through 29, a separate pre-filling pressure is itself adjusted by the pressure control valves 62 through 29.

The structural design of the hydraulic actuating device 1 shown in FIG. 16 leads to no clutches being present between the pressure control valves 62 through 29 by the pre-filling lines. In addition, the independent control of the pre-filling pressure of the valve slide of the pressure control valves 62 through 29 leads to an active pre-filling being no longer required.

Modifications and variations can be made to the embodiments illustrated or described herein without departing from the scope and spirit of the invention as set forth in the appended claims.

REFERENCE SIGNS

1 Hydraulic system, hydraulic actuating device
2 Transmission
3 Piston/cylinder device
3A, 3B Piston chamber
4 Piston/cylinder device
4A, 4B Piston chamber
5 Piston/cylinder device
5A, 5B Piston chamber
6 Piston/cylinder device
6A, 6B Piston chamber
7 Piston/cylinder device
7A, 7B Piston chamber
8 to 12 Shifting element, shifting rod
13 to 15 Shift valve
16 Valve device
17, 18 Pressure control valve unit
19 to 21 Pilot pressure valve unit
22 to 24 Spring device
25 Pressure-reducing valve
26, 27 Pilot pressure control valve
28, 29 Pressure control valve
30 Pressure-limiting valve
31 Low-pressure area
32 to 41 Ball-change valve
42 Pump device
43 First pump unit, vane cell pump
44 Second pump unit, gear set pump
45 Pressure side of the first pump unit
46 Primary pressure circuit
47 System pressure valve
48 Valve device, cooling valve
48A to 48G Valve pocket
49 Thermal bypass valve
50 Thermocouple
51 Cooling unit
52 Bypass valve
53 First area of the secondary pressure circuit
54 Secondary pressure circuit
55 Second area of the secondary pressure circuit
56 Dual-clutch system
57 Suction side of the second pump unit
58 Line
59 Spring device
60 Pilot pressure control valve
61 Gear set cooling valve
62, 63 Clutch valve
64 Pressure side of the second pump unit
65 Check valve device
66 Pressure relief valve
67 Parking brake system
68 Four-wheel clutch, hang-on clutch
69 Suction line
70 Filter device
71 Common oil chamber
72 First oil chamber
73 Second oil chamber
74 Suction line
75 Housing
76 First housing part, valve plate
77 Second housing part, channel plate
78 Interface device
79 Valve slide
80 Non-return valve device, gear set pump valve
81 to 85 Pilot pressure control valve
86 Separating valve
87 Aperture valve
88 Additional clutch valve
89 Pre-filling valve
90 Pre-filling valve
91 Valve unit
A to D2 Control area of the cooling valve
A(x), B(x), C(x) Opening surface
f43, f44 Factor
i60 Actuating current
K1, K2 Clutch
p_B Actuating pressure
p_red Pressure signal
p_VS Pilot pressure
p_sys System pressure
p64 Conveying pressure of the gear set pump
q Volume flow of hydraulic fluid
S1 to S8 Step
x Actuating path of the valve slide of the cooling valve

The invention claimed is:

1. A hydraulic system of a transmission, comprising:
a plurality of pressure control valves including a plurality of clutch valves and a plurality of additional pressure control valves, each pressure control valve of the plurality of pressure control valves configured to adjust an applied pressure to a downstream pressure that is a function of a total force component acting on a valve slide depending on an operating state, the total force component adjustable as a function of a pilot force component applicable on the valve slide, an actuating force component and a regulating force component that is dependent on the downstream pressure, the pilot force component and the actuating force component of the additional pressure control valves applicable in the direction of a first end position of the valve slide, an area upstream of the additional pressure control valves connected to an area downstream of the additional pressure control valves by the additional pressure control valves in the first end position of the additional pressure control valves, the downstream pressure of the additional pressure control valves applicable in the direction of a second end position of the valve slide, the area downstream of the additional pressure control valves connected to a low-pressure area in the second end position of the additional control valves,
wherein the clutch valves are configured to be selectively brought into operative connection by a pilot-controlled valve unit with either pressure area of a primary pressure circuit or with an additional valve unit, the additional valve unit being a pressure-limiting valve with a predefined pressure level adjusted upstream of the additional valve unit and connected downstream to the low-pressure area.

2. The hydraulic system of claim 1, wherein the additional pressure control valves are coupled directly with the pressure area of the primary pressure circuit, and the pressure area of the primary pressure circuit is configured to be pressurized at a system pressure of the primary pressure circuit.

3. The hydraulic system of claim 1, wherein the pilot force component is adjustable as a function of a pilot pressure, the pilot pressure adjustable by a pilot pressure control valve, the pilot pressure applicable in the area of a control surface of the valve slide of one of the pressure control valves.

4. The hydraulic system of claim 1, wherein the actuating force component corresponds to a spring force of a spring device acting on the valve slide of one of the pressure control valves.

5. The hydraulic system of claim 4, wherein the pilot force component and the actuating force component act in opposite directions.

6. The hydraulic system of claim 4, wherein the pilot force component and the actuating force component are aligned.

7. The hydraulic system of claim 1, wherein the pressure control valves are 3/2-way valves.

* * * * *